(12) United States Patent
Sato et al.

(10) Patent No.: US 9,774,241 B2
(45) Date of Patent: Sep. 26, 2017

(54) POWER CONVERSION CIRCUIT AND DEVICE

(71) Applicant: NATIONAL INSTITUTE OF ADVANCED INDUSTRIAL SCIENCE AND TECHNOLOGY, Tokyo (JP)

(72) Inventors: Yukihiko Sato, Ibaraki (JP); Hidemine Obara, Ibaraki (JP); Akira Nakajima, Ibaraki (JP); Hiromichi Oohashi, Ibaraki (JP); Shinichi Nishizawa, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/917,592

(22) PCT Filed: Sep. 5, 2014

(86) PCT No.: PCT/JP2014/073523
§ 371 (c)(1),
(2) Date: Apr. 27, 2016

(87) PCT Pub. No.: WO2015/037537
PCT Pub. Date: Mar. 19, 2015

(65) Prior Publication Data
US 2016/0261178 A1    Sep. 8, 2016

(30) Foreign Application Priority Data

Sep. 10, 2013  (JP) .................................. 2013-186885

(51) Int. Cl.
*H02M 1/08* (2006.01)
*H02M 1/44* (2007.01)
(Continued)

(52) U.S. Cl.
CPC ............... *H02M 1/08* (2013.01); *H02M 1/12* (2013.01); *H02M 1/44* (2013.01); *H02M 3/04* (2013.01);
(Continued)

(58) Field of Classification Search
CPC ............ H02M 1/08; H02M 1/12; H02M 1/44; H02M 3/04; H02M 7/04; H02M 7/44; H02M 7/483
See application file for complete search history.

(56) References Cited

U.S. PATENT DOCUMENTS 8,724,353 B1 * 5/2014 Giuliano ................. H02M 3/07
327/536
9,007,040 B2 * 4/2015 Ikeda .................... H02M 3/158
323/222
(Continued)

FOREIGN PATENT DOCUMENTS

EP    2 568 591 A1    3/2013
JP    5-23794 B2    3/1993
(Continued)

OTHER PUBLICATIONS

Begalke, "A Direct Isolated Bi-directional Converter as a Power Electronic Building Block (PEBB)", Power Electronics Specialists Conference, PESC 2008, pp. 3894-3900.
(Continued)

*Primary Examiner* — Emily P Pham
(74) *Attorney, Agent, or Firm* — Marshall, Gerstein & Borun LLP

(57) ABSTRACT

In a multilevel power conversion circuit, output harmonic waves and electromagnetic noise can be reduced as the number of output levels is increased. This, however, increases the number of elements constituting the circuit, causing the degree of difficulty in mounting to increase, cost
(Continued)

MINIMUM CONFIGURATION (3 LEVELS) OF MULTILEVEL POWER CONVERSION CIRCUIT OF FLYING CAPACITOR TYPE ATTAINED BY ONE OR MORE MODULES to increase, and reliability to decrease. It is necessary to provide a circuit configuration, a design method, and a mounting method for obtaining, at low cost, a multilevel power conversion circuit using a large number of elements. A power conversion circuit is used as a unit module and is equipped with input and output terminals each mounted on the main circuit in an open state, wherein the input and output terminals have a mechanism by which the input and output terminals can be flexibly interconnected with the input and output terminals of another same module. A plurality of the highly expandable power conversion circuit modules are used and combined using various connection methods to obtain multilevel power conversion circuits having various configurations. This makes it possible to change power conversion circuit performances and characteristics, such as the number of levels, voltage, current, power, the number of phases, etc., only by reconfiguring the modules and to provide a multilevel power conversion circuit most suitable for various applications at low cost.

15 Claims, 34 Drawing Sheets

(51) Int. Cl.
H02M 3/04 (2006.01)
H02M 7/483 (2007.01)
H02M 1/12 (2006.01)
H02M 7/04 (2006.01)
H02M 7/44 (2006.01)
H02M 7/493 (2007.01)
H02M 1/00 (2006.01)

(52) U.S. Cl.
CPC ............... *H02M 7/04* (2013.01); *H02M 7/44* (2013.01); *H02M 7/483* (2013.01); *H02M 7/493* (2013.01); *H02M 2001/007* (2013.01)

(56) References Cited

U.S. PATENT DOCUMENTS

| 2009/0195068 | A1 | 8/2009 | Ohashi et al. |
| 2014/0002048 | A1 | 1/2014 | Pang et al. |
| 2014/0043873 | A1* | 2/2014 | Blomberg ............... H02M 1/32 363/53 |
| 2014/0049230 | A1 | 2/2014 | Weyh |
| 2014/0177292 | A1* | 6/2014 | Woodford ................ H02J 3/36 363/35 |

FOREIGN PATENT DOCUMENTS

| JP | 7-111784 | | 4/1995 |
| JP | 8-289567 | | 11/1996 |
| JP | 2001-298151 | A | 10/2001 |
| JP | 2005-341732 | A | 12/2005 |
| JP | 2006-174566 | A | 6/2006 |
| JP | 2009-177951 | A | 8/2009 |
| JP | 2010-093978 | A | 4/2010 |
| JP | 2012-039866 | A | 2/2012 |
| JP | 2013-162019 | A | 8/2013 |
| WO | WO-2011/000428 | A1 | 1/2011 |
| WO | WO-2012/072168 | A2 | 6/2012 |
| WO | WO-2012/126160 | A1 | 9/2012 |

OTHER PUBLICATIONS

Search Report in International Application No. PCT/JP2014/073523 dated Nov. 25, 2014, 4 pages.
International Preliminary Report on Patentability and Written Opinion in International Application No. PCT/JP2014/073523 dated Mar. 15, 2016, 10 pages.
Extended European Search Report in EP Application No. 14843315.4 dated May 16, 2017, 6 pages.

* cited by examiner

THIS MODULE (2-LEVEL/HALF BRIDGE) IS MINIMUM DISASSEMBLY UNIT OF MODULE

ADDITION OF CAPACITOR TO OUTPUT SIDE,
MODIFICATION OF MINIMUM DISASSEMBLY UNIT OF MODULE

ADDITION OF RESISTANCE TO BETWEEN TERMINALS OF
MAIN CIRCUIT SWITCH ELEMENTS, MODIFICATION OF
MINIMUM DISASSEMBLY UNIT OF MODULE

MINIMUM CONFIGURATION (3 LEVELS) OF MULTILEVEL
POWER CONVERSION CIRCUIT OF FLYING CAPACITOR TYPE
ATTAINED BY ONE OR MORE MODULES

MINIMUM CONFIGURATION (3 LEVELS) OF MULTILEVEL
POWER CONVERSION CIRCUIT OF FLYING CAPACITOR TYPE
ATTAINED BY TWO OR MORE MODULES

MINIMUM CONFIGURATION (3 LEVELS) OF MULTILEVEL
POWER CONVERSION CIRCUIT OF CASCADE CONNECTION
TYPE ATTAINED BY TWO OR MORE MODULES

MINIMUM CONFIGURATION (3 LEVELS) OF MULTILEVEL
POWER CONVERSION CIRCUIT OF MODULAR MULTILEVEL
TYPE ATTAINED BY TWO OR MORE MODULES

MINIMUM CONFIGURATION (5 LEVELS) OF MULTILEVEL POWER CONVERSION CIRCUIT OF HYBRID ACTIVE NEUTRAL CLAMP TYPE ATTAINED BY FOUR OR MORE MODULES

MINIMUM CONFIGURATION (5 LEVELS) OF MULTILEVEL POWER CONVERSION CIRCUIT OF STACKED MULTICELL TYPE ATTAINED BY FOUR OR MORE MODULES

PARALLEL CONNECTION

SERIAL CONNECTION 5-level flying capacitor converter

Input voltage: 75 V 9-level
3-phase inverter

9-LEVEL/
3-PHASE INVERTER

SERIAL 2 MODULES X 3 PARALLEL

Input voltage: 150 V 13-level H-bridge

13-LEVEL/
SINGLE-PHASE H BRIDGE

SERIAL 3 MODULES X 2 PARALLEL

Input voltage: 225 V 17-level Half bridge

17-LEVEL/
SINGLE-PHASE HALF BRIDGE

SERIAL 4 MODULES

Input voltage: 300 V

CIRCUIT CONFIGURATION OF UNIT MODULE

MODIFICATION OF CIRCUIT
CONFIGURATION OF UNIT MODULE

MODIFICATION OF CIRCUIT
CONFIGURATION OF UNIT MODULE

FLYING CAPACITOR TYPE ATTAINED BY M-MODULES, GENERAL CONFIGURATION OF MULTILEVEL POWER CONVERSION CIRCUIT

POWER CONVERSION CIRCUIT AND DEVICE

TECHNICAL FIELD

The present invention pertains to a multilevel power conversion circuit and to a circuit technology for attainment of packaging the power conversion circuit at a low cost.

BACKGROUND ART

Generally, a 2-level power conversion circuit capable of outputting a binary voltage is used as the power conversion circuit in a power conversion apparatus.

The following are three problems inherent in the 2-level power conversion circuit. A first problem is that an output voltage contains a large quantity of higher harmonics, and a large harmonic filter is required for outputting preferable alternate current or direct current containing less of higher harmonic components. A second problem is that a large quantity of electromagnetic noises are caused with switching. A third problem is that an improvement of efficiency has a limit because of a large switching loss.

Solutions of the problems inherent in the 2-level power conversion circuit entail researches and developments of multilevel power conversion circuits capable of outputting a ternary or higher-valued voltage, and some of these multilevel power conversion circuits are in practical application. The multilevel power conversion circuit is capable of outputting a voltage waveform that is more approximate to the AC or DC as the level count increases, and the harmonic filter can be therefore downsized as compared with the 2-level power conversion circuit. The voltage applied to one main circuit switch element decreases, and hence it is feasible to reduce the electromagnetic noises and the switching loss.

In a power network system introducing a large amount of distributed power sources, the power conversion apparatuses are connected to respective power sources and loads to thereby prepare a tremendous number of power conversion apparatuses, resulting in a request for reducing the electromagnetic noises and the higher harmonics generated by the power conversion apparatuses to the greatest possible degree.

Accordingly, there is an increased expectation for a clean multilevel power conversion apparatus configured to increase the level count at a great rate above the 2-level power conversion circuit being a mainstream so far.

The multilevel power conversion circuit has, however, a problem that the circuit is configured by an increased number of elements. The increased number of elements lead to a rise in packaging difficulty and bring about an increase in cost and a decline of reliability.

The number of elements configuring the multilevel power conversion apparatus results in becoming larger with a larger stage count (level count) of the voltage to be output. A 3-phase/2-level power conversion circuit of a conventional type is configured by six main circuit switch elements, and, by contrast, each of 3-phase multilevel power conversion circuits of typically a cascade connection H-bridge type, a diode clamp type and a flying capacitor type requires a 6(n−1) number of main circuit switch elements against a level count n.

Each main circuit switch element requires a gate drive circuit, and hence there is a tremendous number of elements of peripheral circuits as the level count is increased. Patent document 1 proposes a method of reducing the number of elements configuring the gate drive circuit of the multilevel power conversion circuit. When a packaging method is improper, the power conversion circuit contains a parasitic inductance and a parasitic capacitance, resulting in causing an increase in electromagnetic noises. A consideration of heat radiation of the elements is also needed.

DOCUMENTS OF PRIOR ARTS

Patent Documents

[Patent Document 1] Japanese Patent Application Laid-Open Publication No. 2009-177951

Non-Patent Document

[Non-Patent Document 1] Todd Begalke: "A Direct Isolated Bi-directional Converter as a Power Electronic Building Block (PEBB)", IEEE Power Electronics Specialists Conference (PESC) 2008, pp. 3894-3900, 2008-6

SUMMARY OF THE INVENTION

Problems to be Solved by the Invention

The multilevel power conversion has the increased number of elements configuring the circuit as the output level count rises, which causes increases in packaging difficulty and cost, and brings about a decline of reliability.

The present invention aims at providing a circuit configuration for attaining a multilevel power conversion apparatus having a large number of elements at a low cost, and a method of packaging the elements used for this circuit.

Non-patent document 1 examines modularizing power conversion systems having a variety of configurations by separating individual elements thereof. This modularization, however, focuses on rearranging a system configuration including a power source, a load, a filter and other equivalent components in addition of a power converter, and lacks in scalability in terms of varying a configuration of the power conversion circuit itself.

Means for Solving the Problems

The present invention provides a multilevel power conversion circuit capable of varying a level count, a voltage, an electric current, a voltage, a phase count and other equivalent factors simply through a simple rearrangement of modules by combining a plurality of modules each configured to include a unit power conversion circuit having a high scalability by a variety of connection methods in the multilevel power conversion circuit, and specifically provides the following multilevel power conversion circuit to thereby solve the problems given above.

The module connoted herein is configured such that all elements are packaged on one board, or packaged as a package molded of an insulator, or packaged as a package covered with one insulator and a metal, or packaged batchwise into one semiconductor and other equivalent elements, and is a device for a power conversion apparatus that can be configured as a desirable apparatus by combining the modules having the same specifications as well as having predetermined specifications instanced by a level count, a voltage, an electric current and electric power. A basic unit power conversion circuit building up the module is given as follows.

(1) A unit power conversion circuit 1 includes: a main circuit 1 configured to include one or more capacitors and two or more main circuit switch elements; and gate drive circuits 3 driving the main circuit switch elements, the unit power conversion circuit 1 being configured as a minimum circuit such that: the main circuit 2 includes a high-sided main circuit switch element 8 with a high-voltage terminal 4 being connected to one terminal of the capacitor 10 and a low-sided main circuit switch element 9 with a low-voltage terminal 5 being connected to the other terminal of the capacitor 10; the low-voltage terminal 6 of the high-sided main circuit switch element 8 and the high-voltage terminal 7 of the low-sided main circuit switch element 9 are respectively opened; and each gate drive circuit 3 is insulated in signal and insulated in power source, alternatively, the unit power conversion circuit 1 being configured as a circuit containing a plurality of the minimum circuits such that: the low-voltage terminal 6 of one high-sided main circuit switch element 8 is connected to the high-voltage terminal 4 of the next high-sided main circuit switch element 8; the high-voltage terminal 7 of one low-sided main circuit switch element 9 is connected to the low-voltage terminal 5 of the next low-sided main circuit switch element 9; the terminals are connected at multi-stages by repeating these connections twice or more; a lowest-voltage terminal 6 of the high-sided main circuit switch element and a highest-voltage terminal 7 of the low-sided main circuit switch element are respectively opened; and each gate drive circuit 3 is insulated in signal and insulated in power source.

(2) A module for a power conversion apparatus includes the unit power conversion circuit 1 according to (1), the circuit (1) further including at least four terminals, i.e., both-sided two terminals of a capacitor of a main circuit, an opened low-voltage terminal of a main circuit switch element on a high side of the main circuit, and an opened high-voltage terminal of the main circuit switch element on a low side of the main circuit, all (elements, wiring and other equivalent components) of the four terminals and the unit power conversion circuit being packaged on one board, or packaged as a package covered with one insulator, or packaged as a package covered with one insulator and a metal, or packaged batchwise into one semiconductor and other equivalent elements. The properly designed modules enable the multilevel power conversion apparatuses having a variety of configurations to be easily attained at a low cost by varying combinations of the unit modules. A module configuration becomes more flexible and easily scalable by further including a connection mechanism.

(3) In the module for the power conversion apparatus according to (2), the four terminals have a connection mechanism enabling each terminal to connect with any of the four terminals of each of the same other unit power conversion circuits.

(4) A multilevel power conversion apparatus includes the modules according to (2) or (3), and the same two or more modules are combined to configure a multilevel power conversion apparatus of a flying capacitor type.

This configuration enables the multilevel power conversion apparatus of the flying capacitor type to be attained by combining the unit modules. The level count, a rated voltage and a rated electric power can be easily increased by increasing the number of connection modules.

A multi-stage configuration can be made as below.

(5) In the multilevel power conversion apparatus according to (4), the multilevel power conversion apparatus of the flying capacitor type is configured by: connecting the lowest-voltage terminal of the main circuit switch element on the high side of one module to the highest-voltage terminal of the main circuit switch element on the high side of the next module; connecting the highest-voltage terminal of the main circuit switch element on the low side of one module to the lowest-voltage terminal of the main circuit switch element on the low side of the next module; connecting the plurality of modules by repeating these connections twice or more; and building up an output terminal by connecting the lowest-voltage terminal of the main circuit switch element on the high side of an extremity module to the highest-voltage terminal of the main circuit switch element on the low side of the extremity module.

(6) A multilevel power conversion apparatus includes the same three or more modules according to (2), which are combined to configure a multilevel power conversion apparatus of an active neutral clamp type.

This configuration enables the multilevel power conversion apparatus of the active neutral clamp type to be attained by combining the unit modules. The level count, the rated voltage and the rated electric power can be easily increased by increasing the number of connection modules.

A following 4-module basis multilevel power conversion apparatus of the active neutral clamp type can be provided.

(7) In the multilevel power conversion apparatus according to (6), the multilevel power conversion apparatus of the active neutral clamp type is configured by: [1] connecting the lowest-voltage terminal of the main circuit switch element on the low side of a first module to the highest-voltage terminal of the main circuit switch element on the high side of a second module; [2] connecting together the lowest-voltage terminal of the main circuit switch element on the high side of the first module, the highest-voltage terminal of the main circuit switch element on the low side of the first module and the highest-voltage terminal of the main circuit switch element on the low side of a third module; [3] connecting together the lowest-voltage terminal of the main circuit switch element on the high side of the second module, the highest-voltage terminal of the main circuit switch element on the low side of the second module and the lowest-voltage terminal of the main circuit switch element on the high side of the third module; and [4] building up an output terminal by connecting the highest-voltage terminal of the main circuit switch element on the high side of the third module to the lowest-voltage terminal of the main circuit switch element on the low side of the third module.

(8) A multilevel power conversion apparatus includes the same four or more modules according to (2) or (3), which are combined to configure a multilevel power conversion apparatus of a hybrid active neutral clamp type.

This configuration enables the multilevel power conversion apparatus of the hybrid active neutral clamp type to be attained by combining the unit modules. The level count, the rated voltage and the rated electric power can be easily increased by increasing the number of connection modules.

A following 4-module basis multilevel power conversion apparatus of the hybrid active neutral clamp type can be provided.

(9) In the multilevel power conversion apparatus according to (8), the multilevel power conversion apparatus of the hybrid active neutral clamp type is configured by: [1] connecting the lowest-voltage terminal of the main circuit switch element on the low side of the first module to the highest-voltage terminal of the main circuit switch element on the high side of the second module; [2] connecting together the lowest-voltage terminal of the main circuit switch element on the high side of the first module, the highest-voltage terminal of the main circuit switch element on the low side of the first module and the highest-voltage terminal of the main circuit switch element on the low side of the third module; [3] connecting together the lowest-voltage terminal of the main circuit switch element on the high side of the second module, the highest-voltage terminal of the main circuit switch element on the low side of the second module and the lowest-voltage terminal of the main circuit switch element on the high side of the third module; [4] connecting the highest-voltage terminal of the main circuit switch element on the high side of the third module to the lowest-voltage terminal of the main circuit switch element on the low side of a fourth module; [5] connecting the lowest-voltage terminal of the main circuit switch element on the low side of the third module to the highest-voltage terminal of the main circuit switch element on the high side of the fourth module; and [6] building up an output terminal by connecting, the lowest-voltage terminal of the main circuit switch element on the high side of the fourth module to the highest-voltage terminal of the main circuit switch element on the low side of the fourth module.

(10) A multilevel power conversion apparatus includes the same four or more modules according to (2) or (3), which are combined to configure a multilevel power conversion apparatus of a stacked multicell type.

This configuration enables the multilevel power conversion apparatus of the stacked multicell type to be attained by combining the unit modules. The level count, the rated voltage and the rated electric power can be easily increased by increasing the number of connection modules.

A following 4-module basis multilevel power conversion apparatus of the stacked multicell type can be provided.

(11) In the multilevel power conversion apparatus according to (10), the multilevel power conversion apparatus of the stacked multicell type is configured by: [1] connecting the lowest-voltage terminal of the main circuit switch element on the high side of the first module to the highest-voltage terminal of the main circuit switch element on the high side of the third module; [2] connecting the highest-voltage terminal of the main circuit switch element on the low side of the first module to the highest-voltage terminal of the main circuit switch element on the low side of the second module; [3] connecting the lowest-voltage terminal of the main circuit switch element on the low side of the second module to the lowest-voltage terminal of the main circuit switch element on the low side of the third module; [4] connecting the highest-voltage terminal of the main circuit switch element on the high side of the second module to the lowest-voltage terminal of the main circuit switch element on the low side of the fourth module; [5] connecting the highest-voltage terminal of the main circuit switch element on the low side of the third module to the highest-voltage terminal of the main circuit switch element on the high side of the fourth module; [6] connecting a capacitor to between the lowest-voltage terminal of the main circuit switch element on the low side of the first module and the lowest-voltage terminal of the main circuit switch element on the high side of the second module; [7] setting, as input terminals, the highest-voltage terminal of the main circuit switch element on the high side of the first module and the lowest-voltage terminal of the main circuit switch element on the high side of the second module; and [8] setting, as output terminals, the lowest-voltage terminal of the main circuit switch element on the high side of the third module, the lowest-voltage terminal of the main circuit switch element on the high side of the module the fourth module and the highest-voltage terminal of the main circuit switch element on the low side of the fourth module.

(12) In the multilevel power conversion apparatus according to (4) or (5), the mechanism for mutually connecting the respective terminals of the modules in the same modules, is equipped with a structure capable of attaining multi-stage connections and parallel connections by arranging the modules alternately and stacking the modules in a perpendicular direction, an arrangement being such that the both-sided two terminals of the capacitor and other two terminals are disposed in plane symmetry on respective front and back surfaces with respect to each surface and in point symmetry on the front or back surface with respect to each other in each module, or alternatively the both-sided two terminals of the capacitor and other two terminals are disposed in point symmetry on each of the front and back surfaces with respect to each other.

With this configuration, the plurality of modules can be connected without any excessive elongation, causing the electromagnetic noises, of a wiring distance between the modules. The modules, which can be connected compactly, contribute to downsizing the attained multilevel power conversion apparatus of the flying capacitor type.

(13) In the multilevel power conversion apparatus according to any one of (4) through (11), with respect to the same modules, the mechanism for mutually connecting the respective terminals of the modules further includes a mechanism capable of connecting with a device for connecting the plurality of modules. The use of the device for connecting the plurality of modules enables the plurality of modules to be connected in every possible combination without depending on the circuit configuration and structure of the unit modules, and hence the scalability and the versatility rise at the tremendous rate.

(14) In the multilevel power conversion apparatus according to (4) or (5), with respect to the same modules, a resistance is connected to between the high-voltage terminal and the low-voltage terminal of each main circuit switch element.

With this configuration, the multilevel power converter of the flying capacitor type is built up by connecting the plurality of present modules at the multi-stages, on which occasion the resistance works to flow the compensation current to compensate the imbalance of the voltage of each capacitor, thereby providing a stabler operation of the power converter.

(15) In the multilevel power conversion apparatus according to (4) or (5), with respect to the same modules, a capacitor is connected to between the low-voltage terminal of the main circuit switch element on the high side and the high-voltage terminal of the main circuit switch element on the low side.

With this configuration, the multilevel power converter of the flying capacitor type is built up by connecting the plurality of present modules at the multi-stages, on which occasion the capacitor absorbs the electromagnetic noises and the switching surge generated due to the parasitic inductance and the parasitic capacitance of the wiring between the modules, whereby the generated electromagnetic noises can be reduced.

Effect of the Invention

According to the present invention, in the multilevel power conversion circuit having the larger number of circuit elements than by the conventional method, the multilevel power conversion circuit having the arbitrary level count can be manufactured by combining the plurality of standard power conversion circuit modules not causing any problem in packaging. In other words, it is feasible to manufacture a super multilevel inverter capable of reducing the higher harmonics and the electromagnetic noises to the greater degree than by the conventional method.

The circuit system, and the voltage, the electric current, electric power, the phase count, the output waveform and other equivalent values each manageable by the power converter can be varied simply by changing the module connection method. In other words, the power converter optimal to a variety of applications can be manufactured simply by combining the standardized modules having the high scalability, whereby the cost can be largely reduced.

The variety of circuit configurations can be attained by rearranging the standardized modules, and it is therefore possible to design and manufacture the power converter circuit at the low cost, matching with the configurations on the power source side and the load side.

DESCRIPTION OF EMBODIMENTS

Mode for Carrying Out the Invention

To start with, a mode for carrying out the present invention (which will hereinafter be termed an embodiment) will hereinafter be described. Next, an Example exemplifies a design instance and a packaging instance of a multilevel power conversion circuit module of a flying capacitor type, and demonstrates measurement results given by a prototype device.

Figure 1:
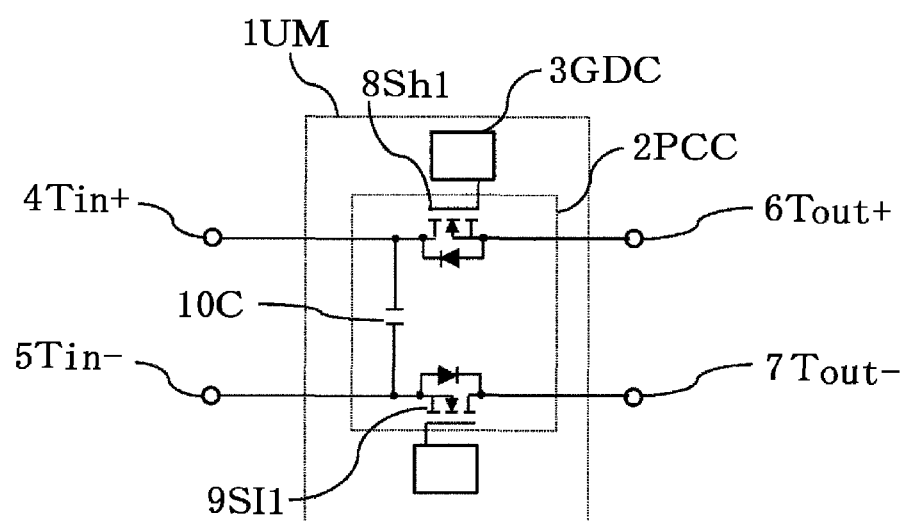
FIG. 1 illustrates a minimum unit circuit configuration of a unit module.
Figure 2:
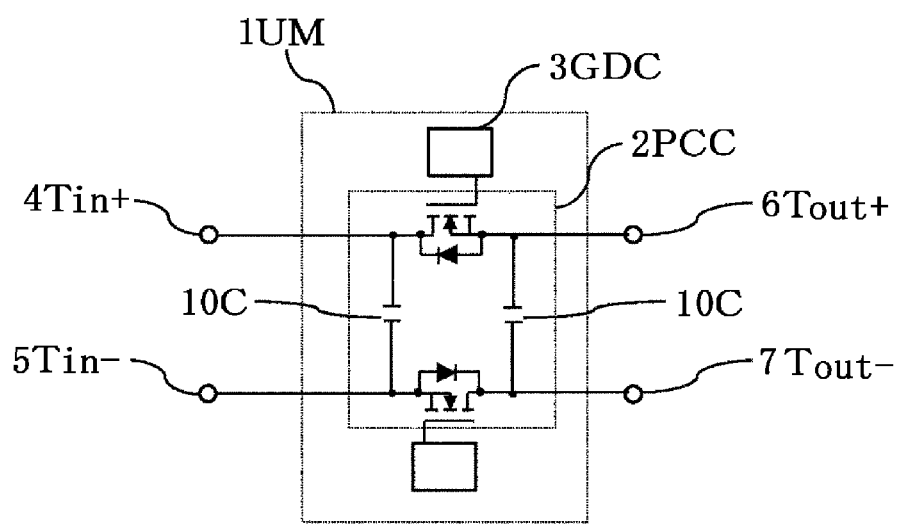
FIG. 2 illustrates a minimum unit circuit configuration as a modification of the unit module when adding a capacitor according to the present invention.
Figure 30:
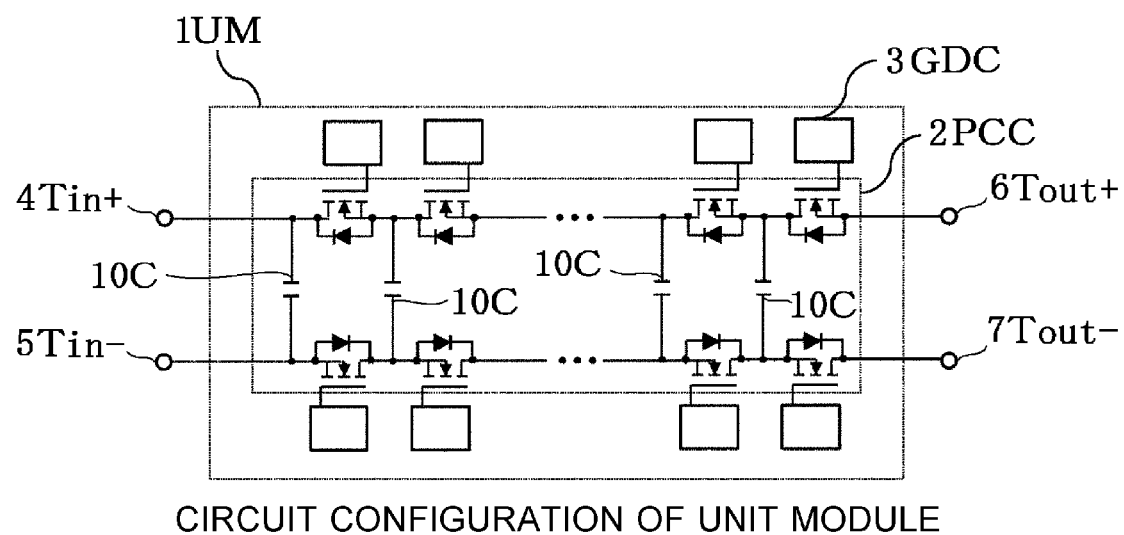
FIG. 30 illustrates a general type of circuit configuration of the unit module according to the present invention.
Figure 31:
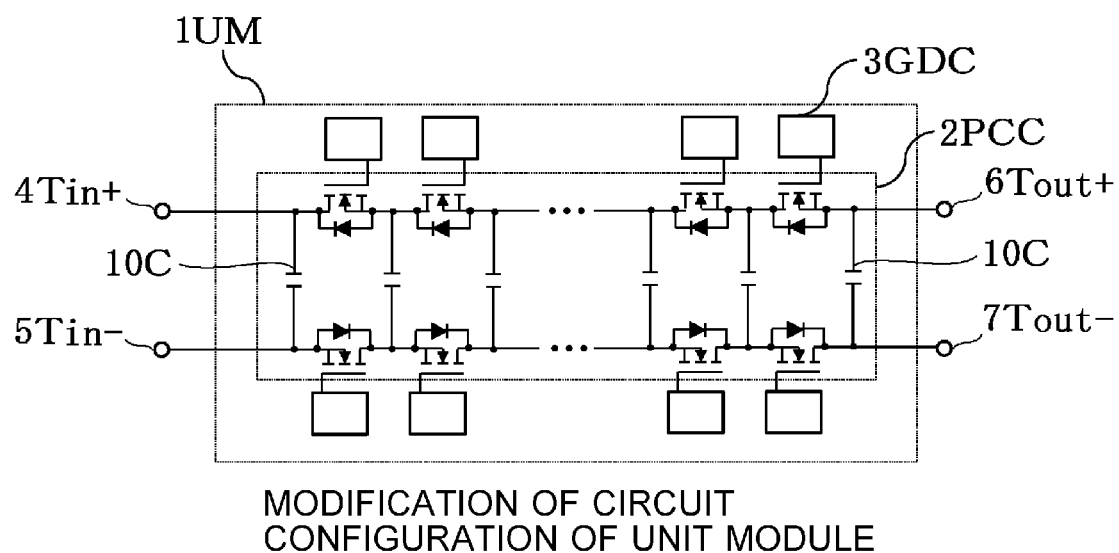
FIG. 31 illustrates the general type of circuit configuration when adding the capacitors as a modification of the unit module according to the present invention.

A power conversion circuit unit module according to the present invention is configured to include, as illustrated in FIGS. 1 and 30, at least two or more main circuit switch elements, one or more capacitors and a gate drive circuit to drive the main circuit switch elements. The multilevel power conversion circuit having a variety of configurations can be attained simply by connecting a plurality of unit modules and reorganizing the same unit modules.

The unit module can be also configured by adding capacitors to between low-voltage terminals of the main circuit switch elements on a high side and high-voltage terminals of the main circuit switch elements on a low side. This case enables a reduction of electromagnetic noises emitted due to parasitic inductances and parasitic capacitances of wires between the modules when connecting the plurality of modules at multi-stages. The following discussion will describe only the module not to connect the capacitor to between the output terminals; however, the same as the above-mentioned is applied to a case of connecting the capacitor to between the output terminals.

Figure 3:
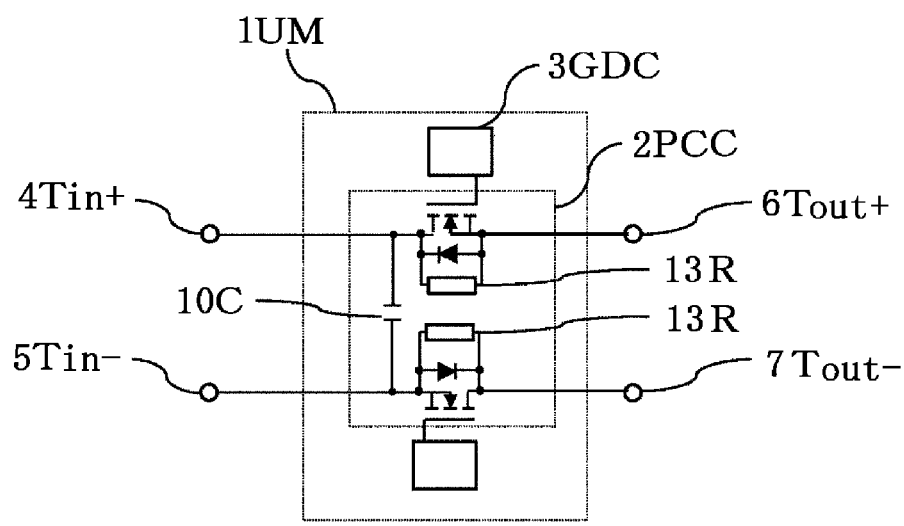
FIG. 3 illustrates a minimum unit circuit configuration as a modification of the unit module when adding a resistance according to the present invention.
Figure 32:
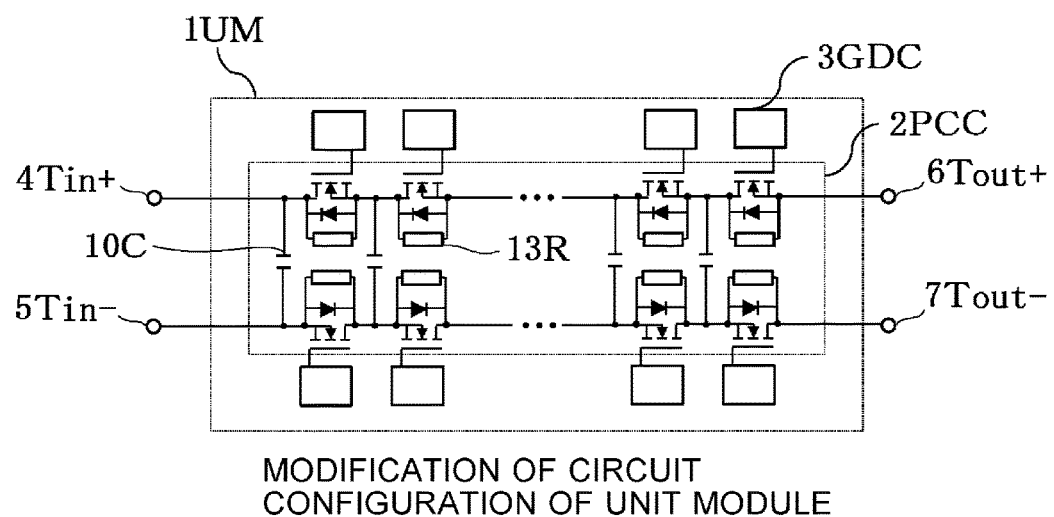
FIG. 32 illustrates the general type of circuit configuration when adding resistances as a modification of the unit module according to the present invention.

The unit module can be also, as in FIGS. 3 and 32, configured to add a resistance to between the high-voltage terminal of the main circuit switch element and the low-voltage terminal of the main circuit switch element. In this case, the multilevel power conversion circuit module of the flying capacitor type is attained by connecting the plurality of modules at the multi-stages, on which occasion this resistance functions as a compensator for voltage imbalance between the respective capacitors. This configuration enables a stable operation of the power conversion circuit. The following discussion will describe only the module not to connect the capacitor to between the output terminals; however, the same as the above-mentioned is applied to the case of connecting the capacitor to between the output terminals.

In the power conversion circuit unit module described above, the main circuit switch element may involve using a semiconductor power device instanced by a MOSFET (Metal Oxide Semiconductor Field Effect Transistor), a MISFET (Metal Insulator Semiconductor Field Effect Transistor), an HFET (Hetero-structure Field Effect Transistor), a JFET (Junction Field Effect Transistor), a BT (Bipolar Transistor), an IGBT (Insulated Gate Bipolar Transistor), an IEGT (Injection Enhanced Gate Transistor) and a GTO thyristor (Gate Turn-Off Thyristor). Semiconductor materials of these power devices are all available regardless of types instanced by Si, GaAs, SiC and GaN. The capacitor may involve using a variety of capacitors instanced by a ceramic capacitor, an aluminum electrolytic capacitor, a film capacitor and a semiconductor capacitor.

The present invention is characterized in that two terminals of the capacitor and the two terminals, which are the low-voltage terminal of the main circuit switch element on the high side of the main circuit and the high-voltage terminal of the main circuit switch element on the low side, i.e., totally four terminals in the unit module are interconnectable in an open state, and is characterized by including a connection mechanism interconnectable to the respective terminals of same other modules. Further, a signal and a control power source of each gate drive circuit are insulated.

The signal insulation is attained by a photo coupler, a magnetic coupler, a transformer, a level shift circuit and other equivalent elements. The power source insulation is attained by the transformer, an insulated DC/DC converter, an insulated AC/DC converter, a bootstrap circuit, a charge pump circuit, a self power supply circuit and other equivalent elements.

With the unit module taking the configuration described above, a variety of multilevel power conversion circuit modules can be attained by combining the plurality of modules with multiple configurations.

Figure 4:
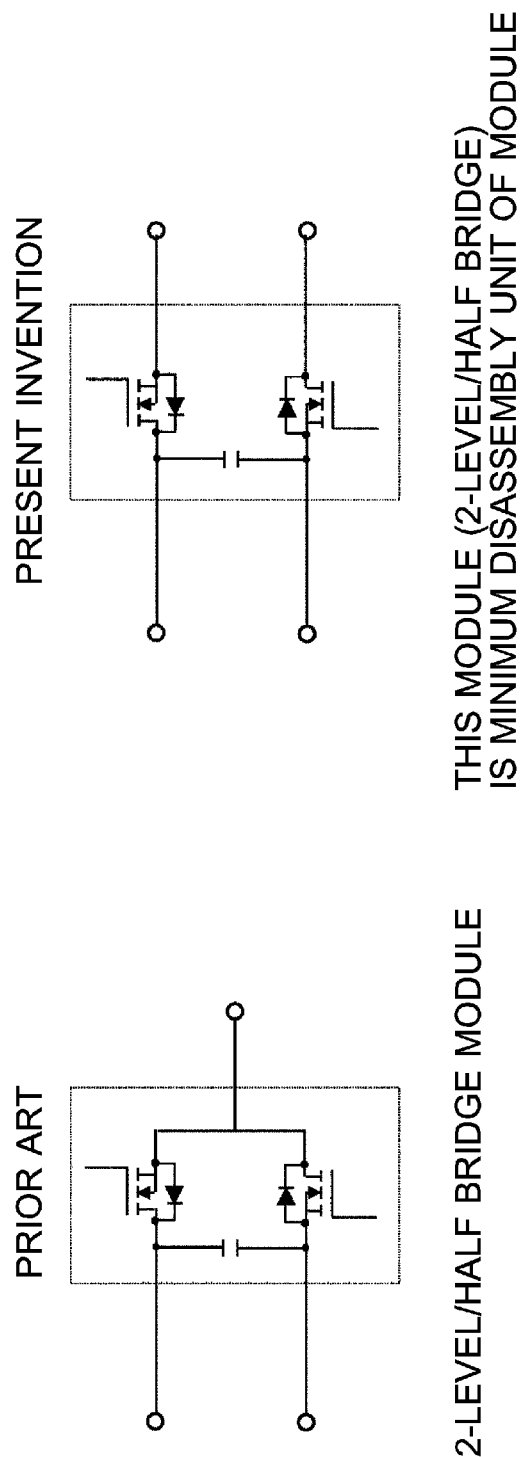
FIG. 4 illustrates a comparison between a circuit configuration of a module according to a prior art and the circuit configuration of the unit module according to the present invention.

FIG. 4 illustrates a comparison between the prior art and the present invention. The prior art aimed at operating in a module simplex with output two terminals of the main circuit being short-circuited, and was therefore disabled from flexibly extending to configurations other than the above. The present invention configures the unit module with the output two terminals of the main circuit being opened, thereby enabling the multi-stage connections that were unfeasible by the prior arts and thus providing high scalability and versatility.

Figure 5:
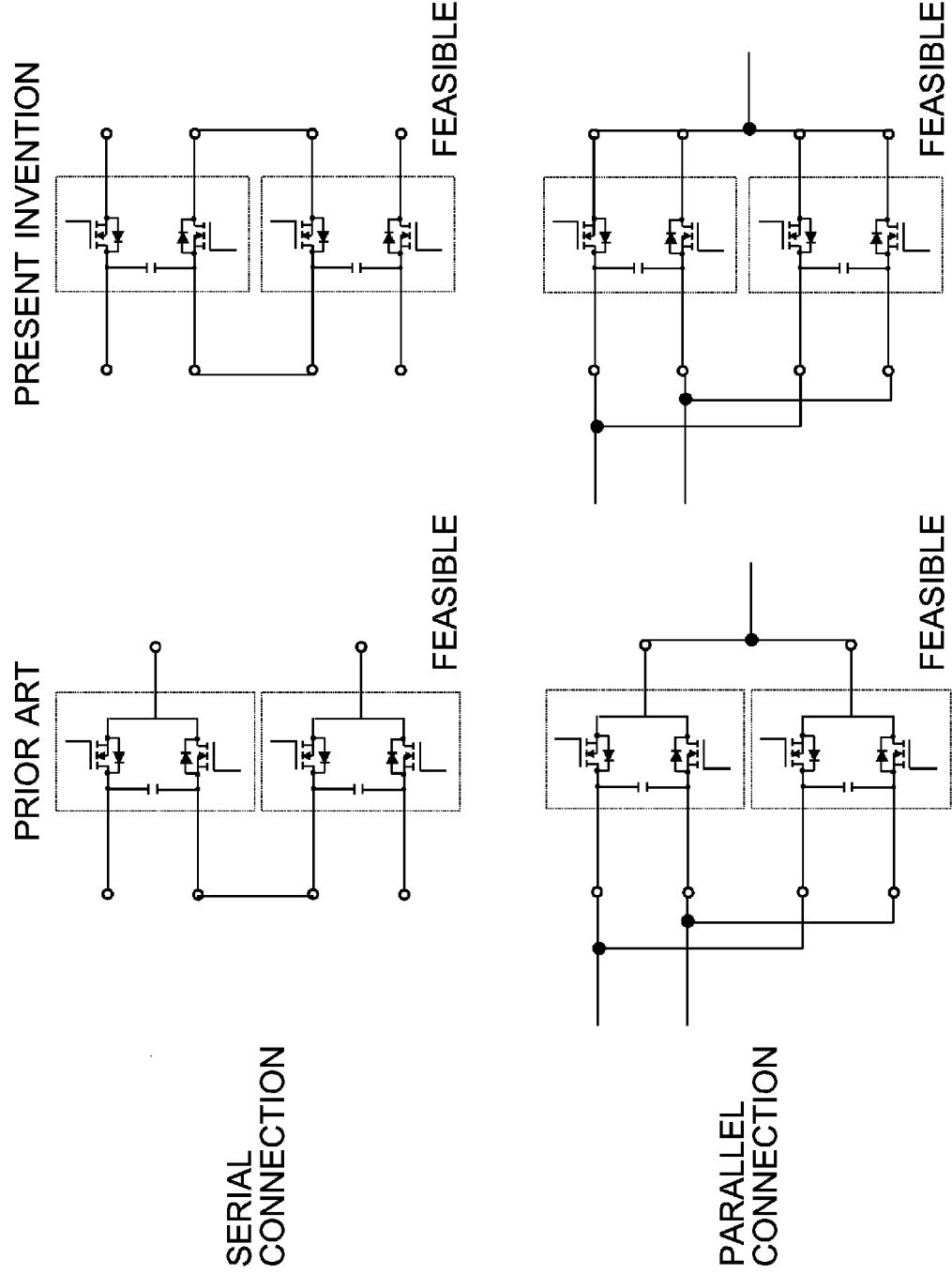
FIG. 5 illustrates feasibilities of serial connections and parallel connections when connecting two or more modules in the prior art and the present invention, respectively.
Figure 33:
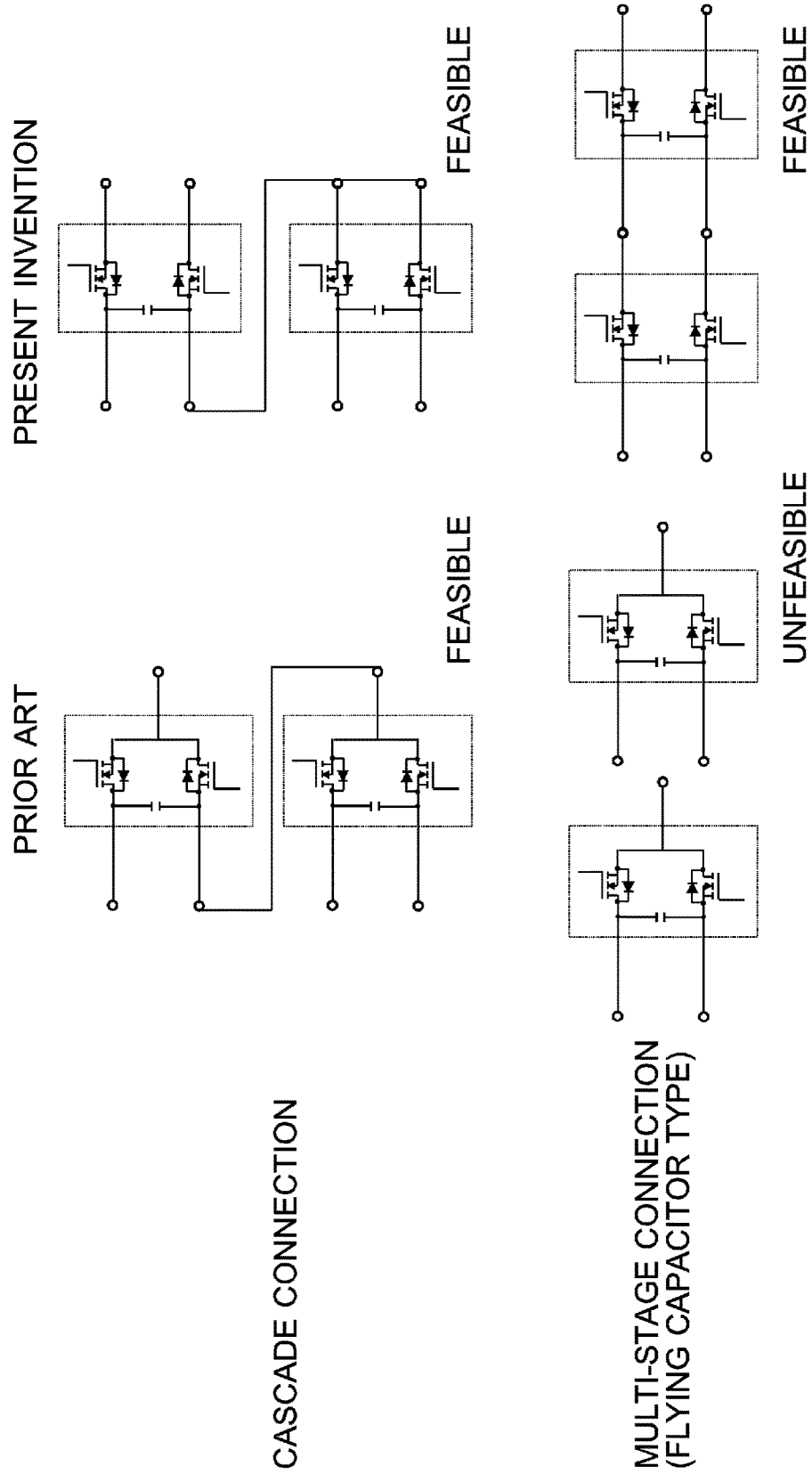
FIG. 33 illustrates feasibilities of the cascade connection and the multi-stage connection when connecting the two or more modules in the prior art and the present invention.

FIGS. 5 and 33 illustrate feasibilities of connection methods when connecting two or more modules in the prior art and the present invention. It is recognized that the configuration of the present invention increases a degree of freedom of the connection.

The multilevel power conversion circuit module (which will hereinafter be termed a modules-combined multilevel power conversion apparatus) attained by combining the plurality of modules with a variety of configurations, is capable of varying one or more of a circuit system, an output level count, a manageable voltage, a manageable electric current, a manageable power, a manageable frequency, a number of phases and other equivalent values by a manner of how the modules are connected.

Figure 6:
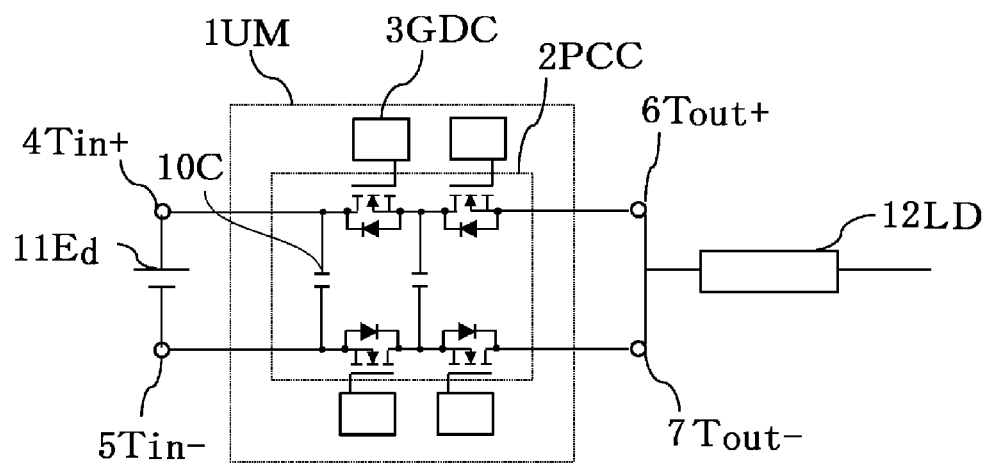
FIG. 6 illustrates a minimum configuration of a 3-level multilevel power conversion circuit of a flying capacitor type, which is attained by one or more modules according to the present invention.

A method of attaining the multilevel power conversion circuit by use of the unit modules, will be described. At first, in one unit module, as illustrated in FIG. 6, the multilevel power conversion circuit of the flying capacitor type can be attained by the module simplex in a way that uses four or more main circuit switch elements and two or more capacitors. At this time, an output level count n is given by:

[Mathematical Expression 1]

$$n = k+1 \qquad (1)$$

where k is the number of main circuit switch elements on the high-voltage side (upper side in the circuit diagram) or the low-voltage side in the unit module.

Figure 7:
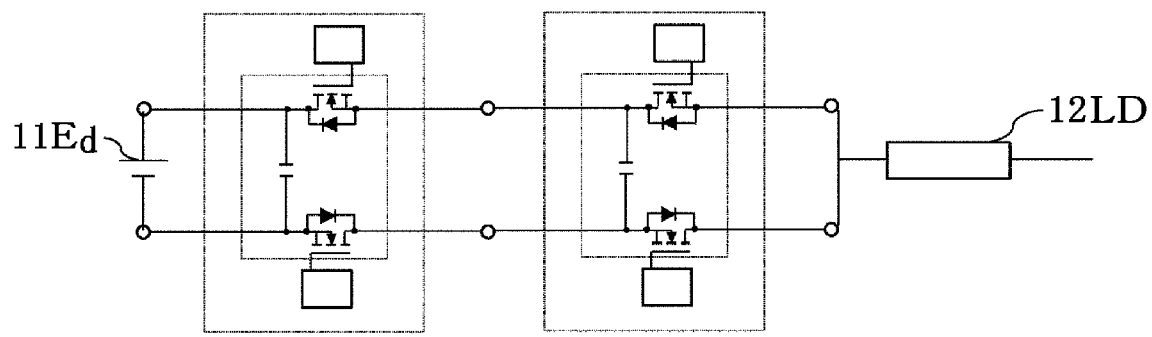
FIG. 7 illustrates a minimum configuration of the 3-level multilevel power conversion circuit of the flying capacitor type, which is attained by two or more modules according to the present invention.
Figure 34:
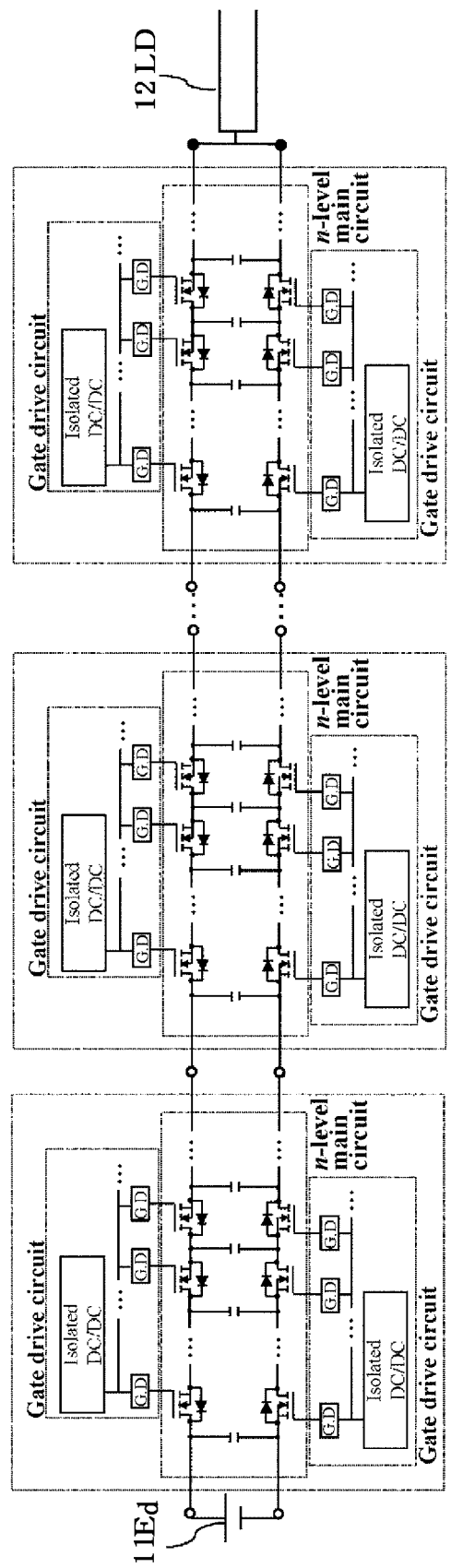
FIG. 34 illustrates a general configuration of the multilevel power conversion circuit of the flying capacitor type, which is attained by the two or more modules according to the present invention.

The multilevel power conversion circuit of the flying capacitor type can be attained by combining two or more unit modules. FIG. 7 is a diagram of a minimum configuration, and FIG. 34 is a diagram of a general configuration.

Figure 8:
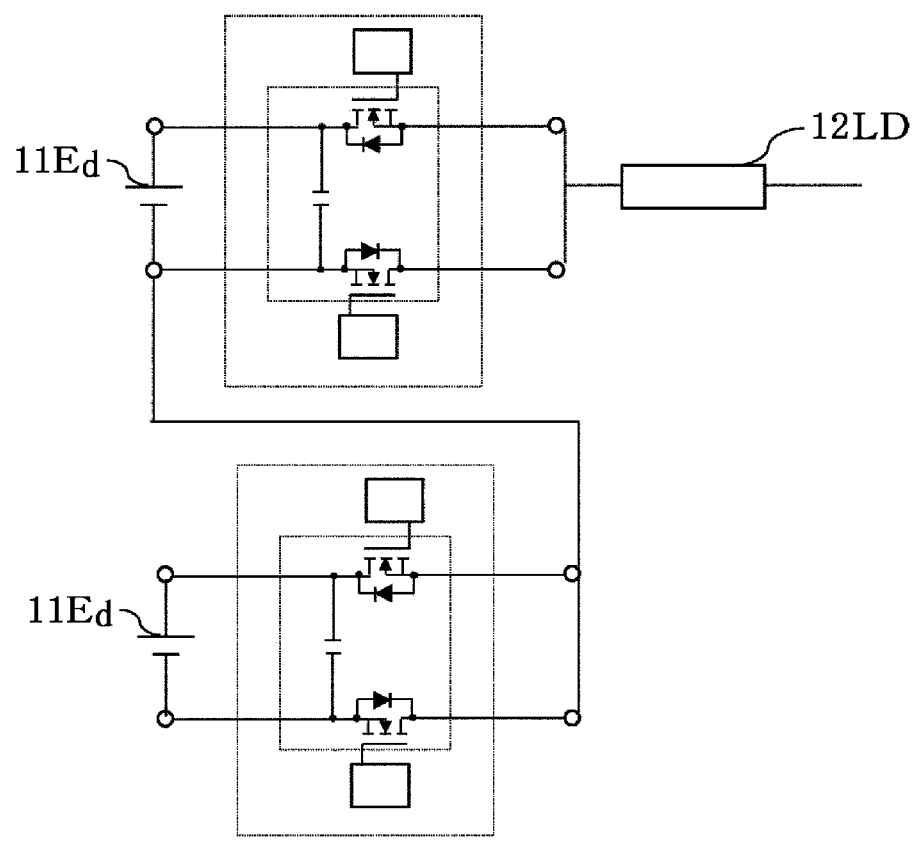
FIG. 8 illustrates a minimum configuration of the 3-level multilevel power conversion circuit of a cascade connection type, which is attained by two or more modules according to the present invention.

The multilevel power conversion circuit of a cascade connection type can be attained by combining two or more unit modules. FIG. 8 is a diagram of a minimum configuration thereof.

Figure 9:
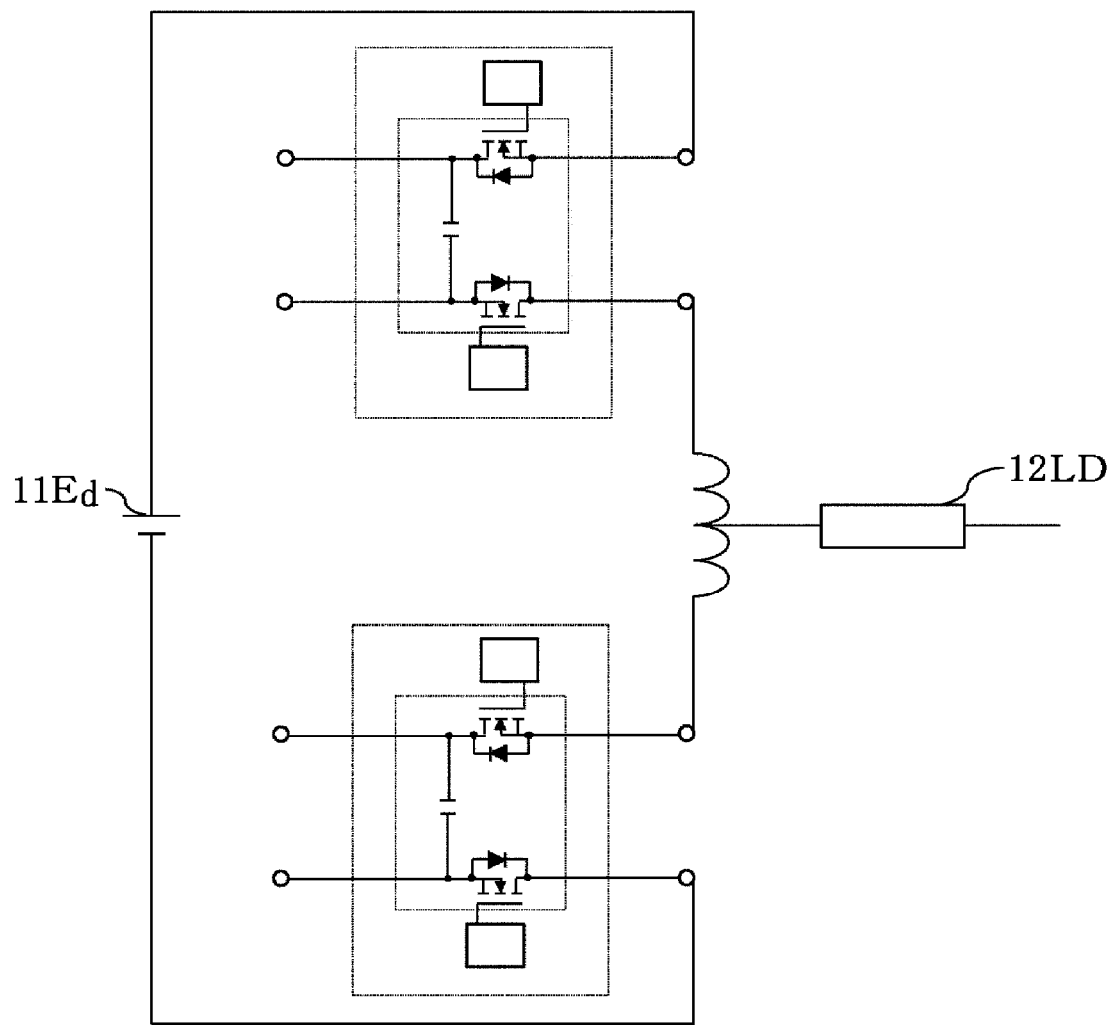
FIG. 9 illustrates a minimum configuration of the 3-level multilevel power conversion circuit of a stacked multicell type, which is attained by three or more modules according to the present invention.

The multilevel power conversion circuit of a modular multilevel type can be attained by combining two or more unit modules. FIG. 9 is a diagram of a minimum configuration thereof.

Figure 10:
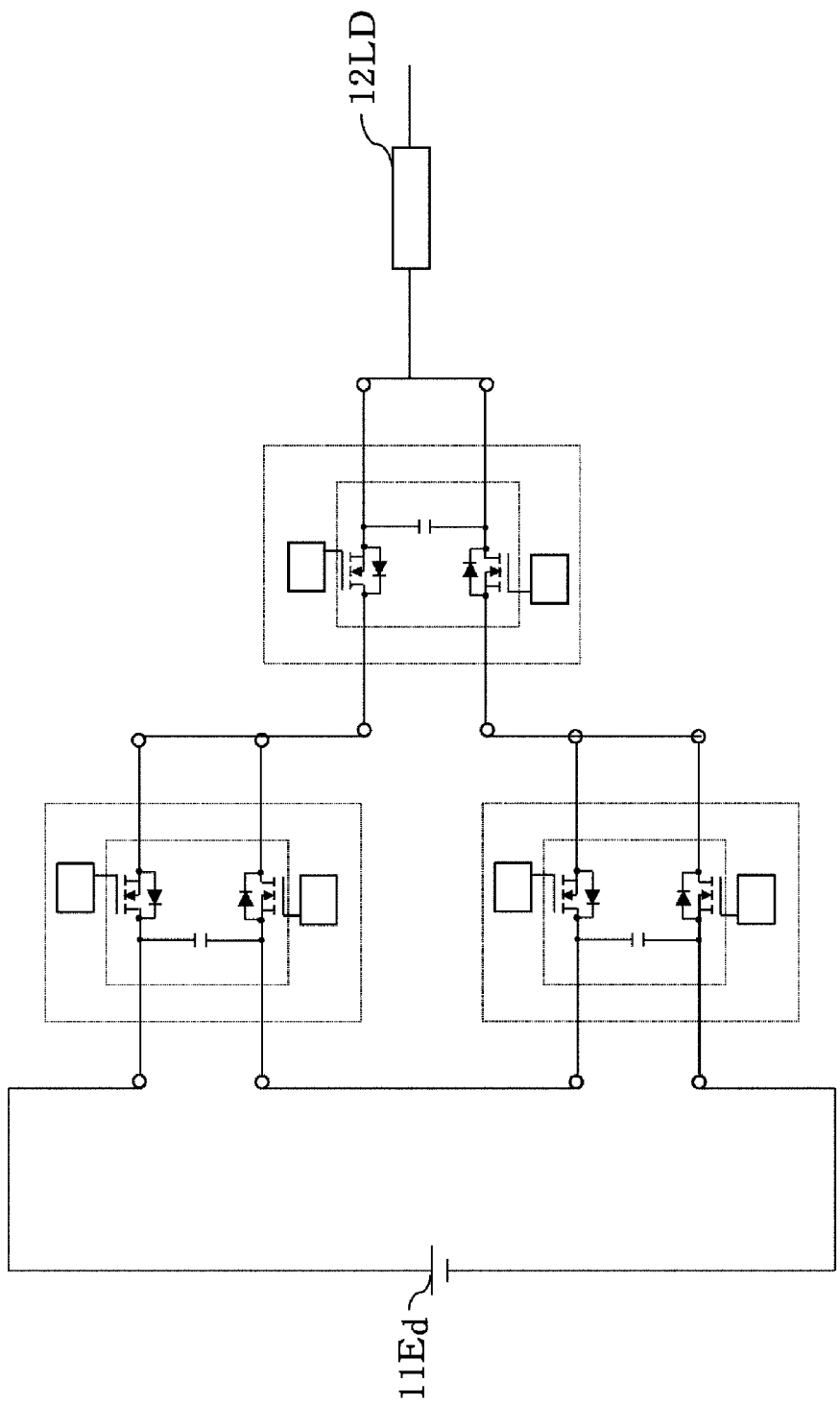
FIG. 10 illustrates a minimum configuration of the 3-level multilevel power conversion circuit of an active neutral clamp type, which is attained by three or more modules according to the present invention.

The multilevel power conversion circuit of an active neutral clamp type can be attained by combining three or more unit modules each having a main circuit switch element count 2 k (=2). FIG. 10 is a diagram of a minimum configuration thereof.

Figure 11:
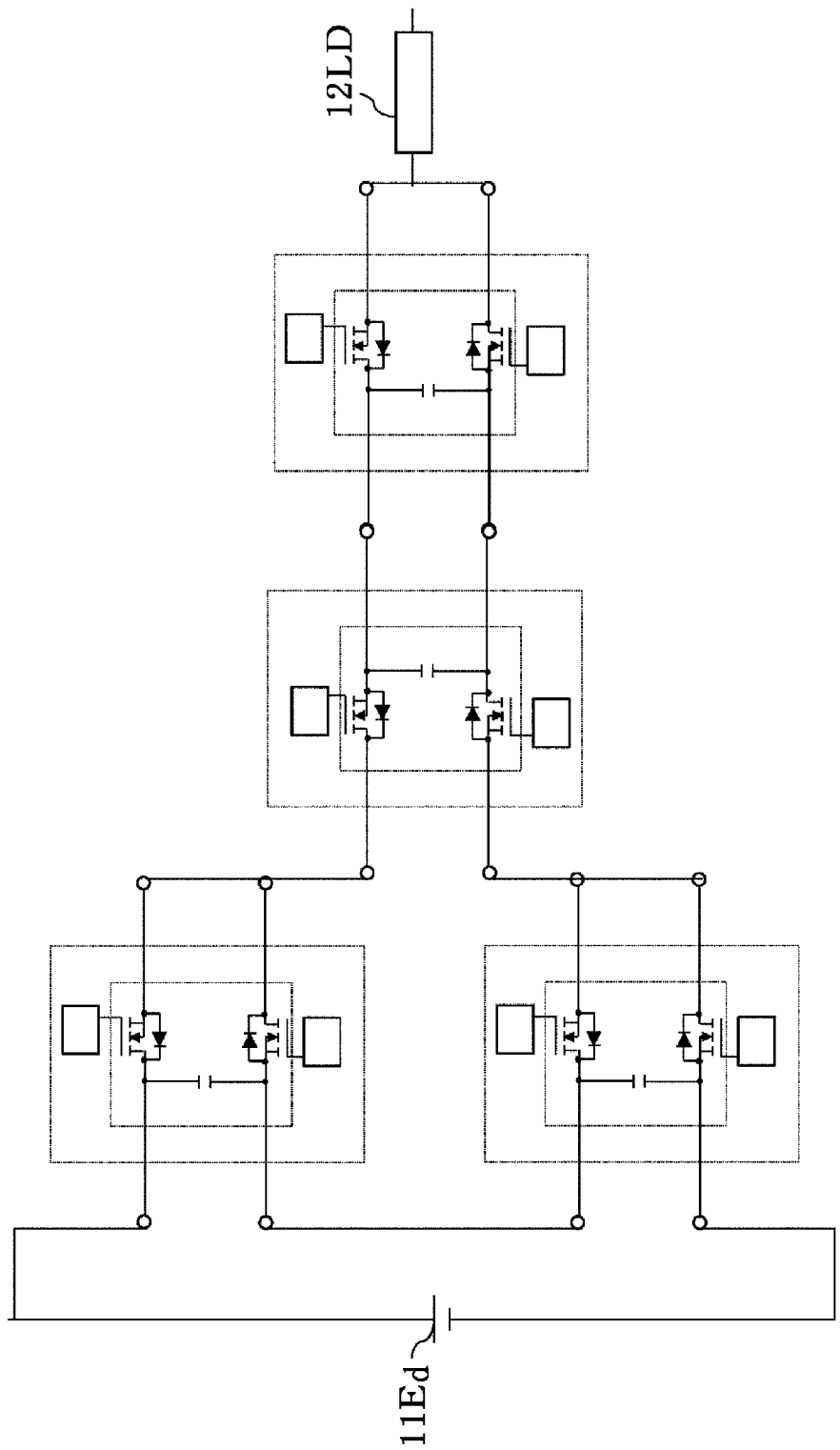
FIG. 11 illustrates a minimum configuration of a 5-level multilevel power conversion circuit of a hybrid active neutral clamp type, which is attained by four or more modules according to the present invention.

The multilevel power conversion circuit of a hybrid active neutral clamp type can be attained by combining four or more unit modules each having the main circuit switch element count 2 k (=2). FIG. 11 is a diagram of a minimum configuration thereof.

Figure 12:
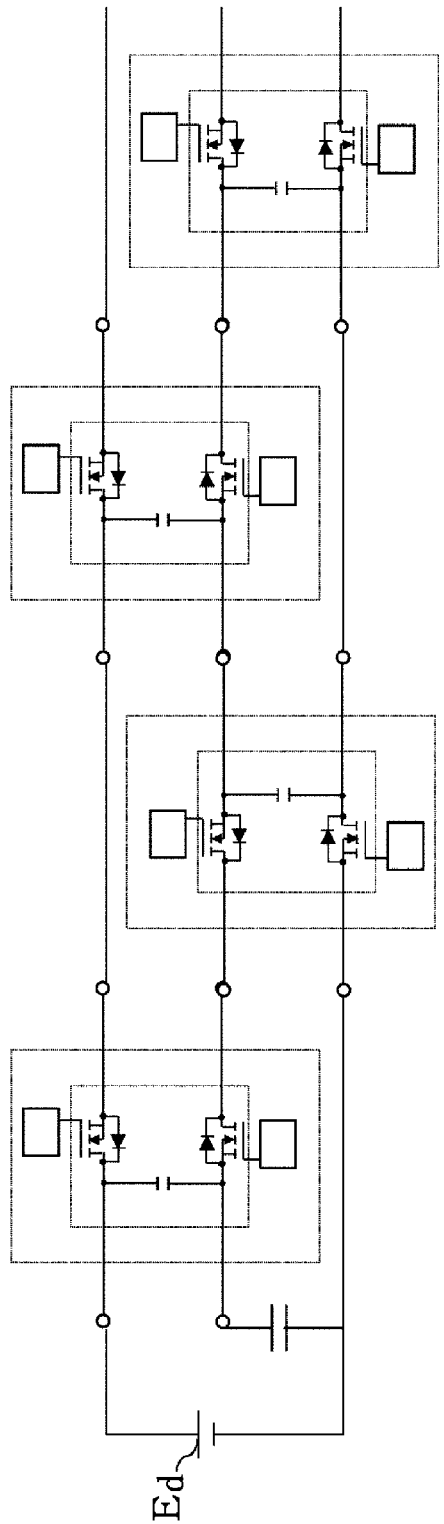
FIG. 12 illustrates a minimum configuration of the 5-level multilevel power conversion circuit of a stacked multicell type, which is attained by four or more modules according to the present invention.

The multilevel power conversion circuit of a stack multicell type can be attained by combining four or more unit modules each having a main circuit switch element count 2 k (=2). FIG. 12 is a diagram of a minimum configuration thereof.

Figure 13:
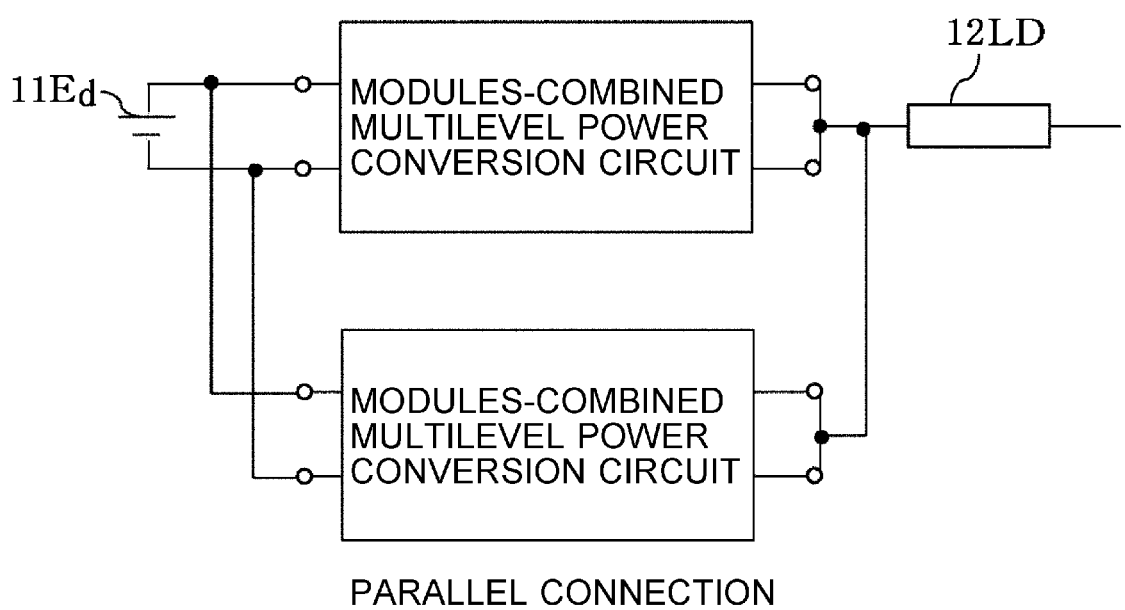
FIG. 13 illustrates a multilevel power conversion circuit attained by combining at least two or more modules-combined multilevel power conversion apparatuses according to the present invention and connecting input terminals and output terminals in parallel.

As in FIG. 13, the multilevel power conversion circuit can be attained by combining at least two or more modules-combined multilevel power conversion apparatuses, and connecting the input terminals through the output terminals in parallel. In this case, the manageable current and power can be augmented in proportion to the number of the modules-combined multilevel power conversion apparatuses connected in parallel.

Figure 14:
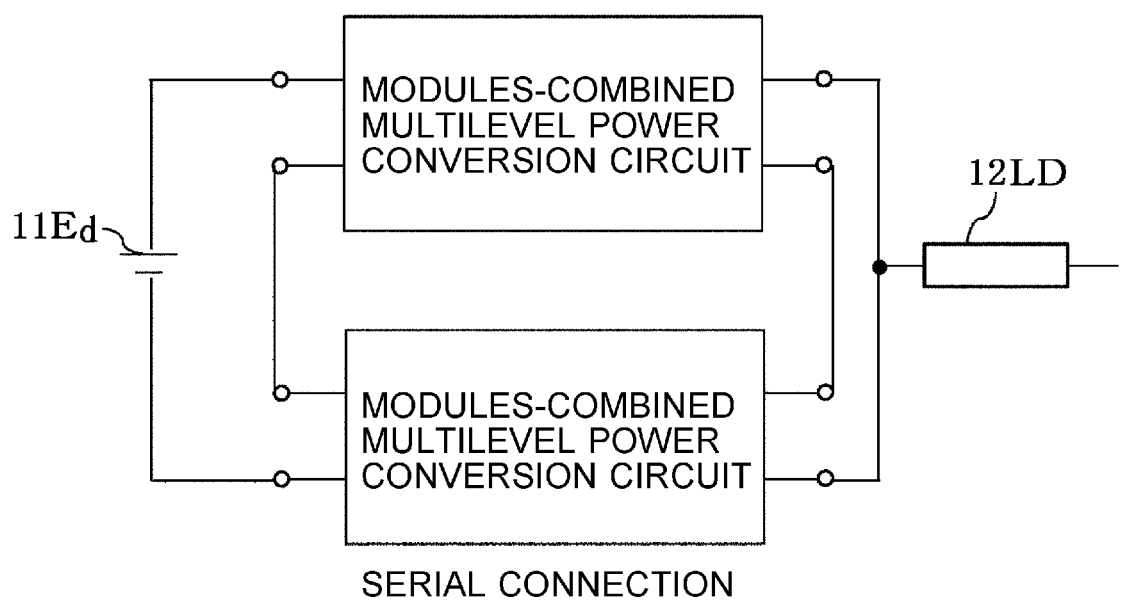
FIG. 14 illustrates the multilevel power conversion circuit attained by combining at least two or more modules-combined multilevel power conversion apparatuses according to the present invention and connecting input terminals and output terminals in series.

As in FIG. 14, the multilevel power conversion circuit can be attained by combining at least two or more modules-combined multilevel power conversion apparatuses, and connecting the input terminals through the output terminals in series. In this case, the manageable current and power can be augmented in proportion to the number of the modules-combined multilevel power conversion apparatuses connected in series.

Figure 15:
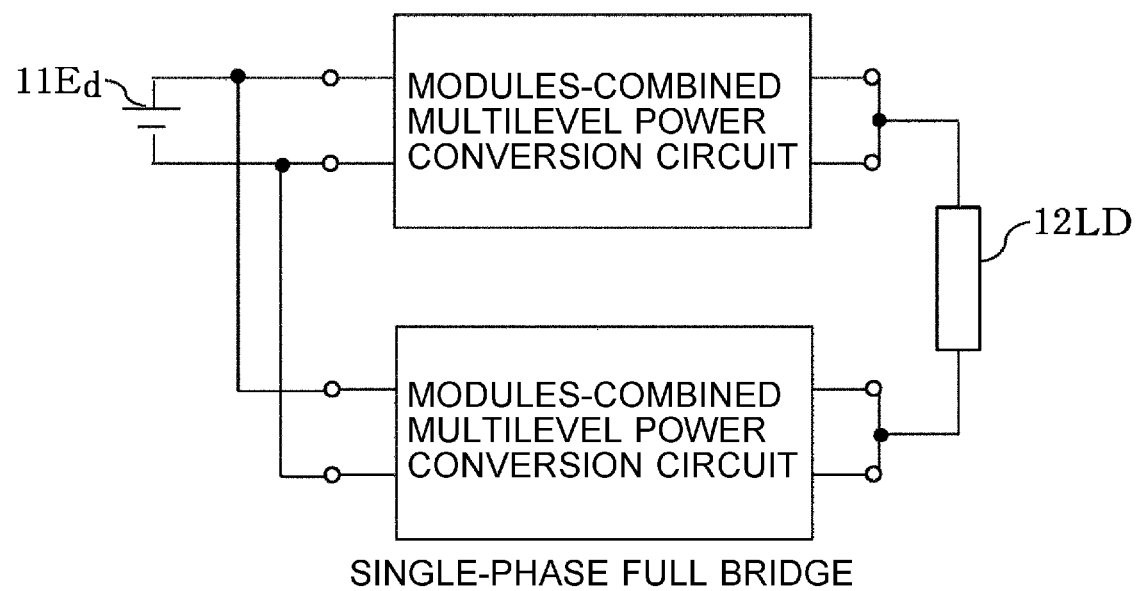
FIG. 15 illustrates a multilevel power conversion circuit based on a single-phase full bridge configuration, which is attained by combining at least two or more modules-combined multilevel power conversion apparatuses according to the present invention and connecting input terminals and output terminals in parallel.

As in FIG. 15, the multilevel power conversion circuit based on a single-phase full bridge configuration can be attained by combining at least two or more modules-combined multilevel power conversion apparatuses. In this case, it is feasible to output the voltage and the power, which are twice as high as those of the modules-combined multilevel power conversion apparatus.

Figure 16:
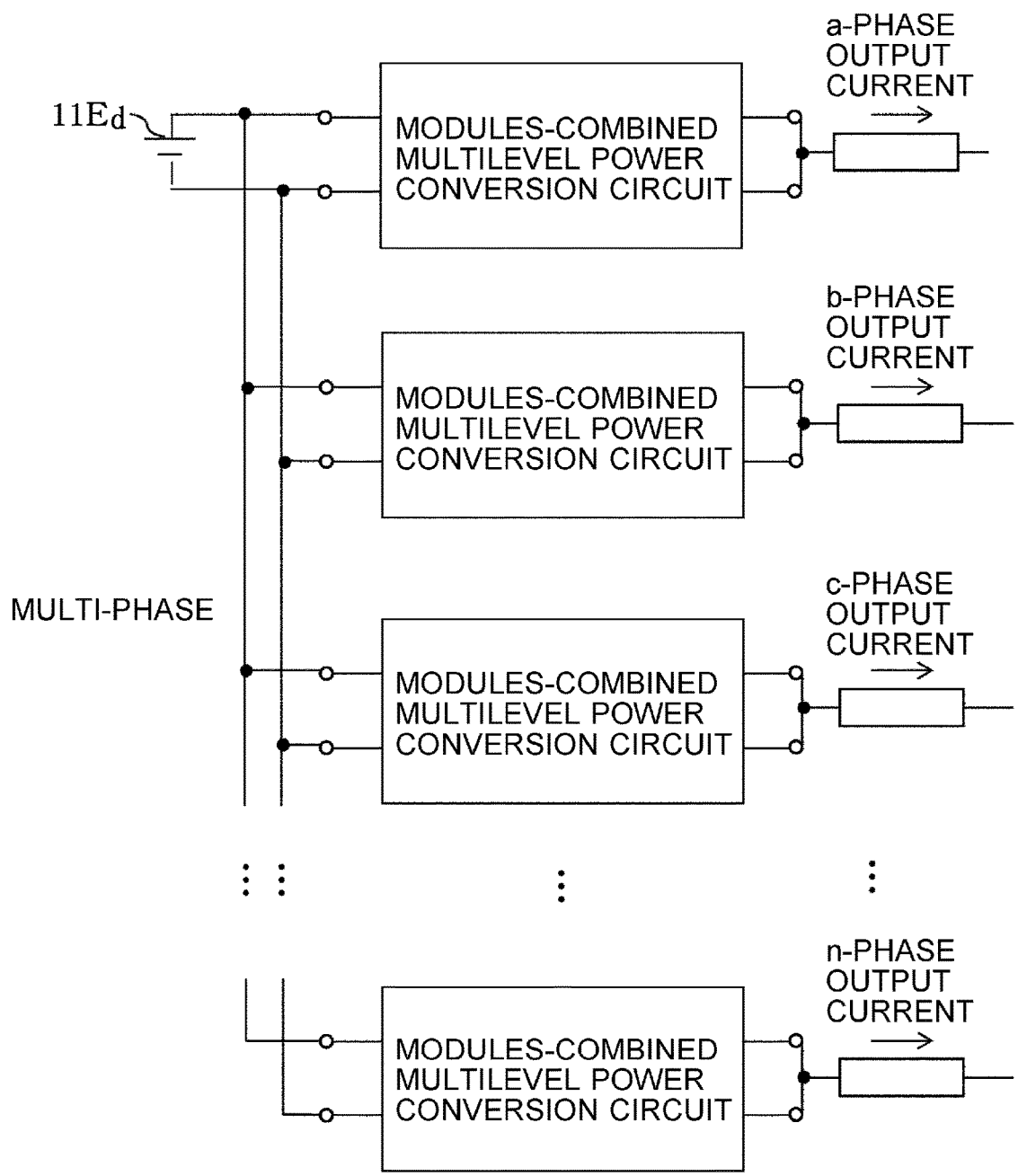
FIG. 16 illustrates a multilevel power conversion circuit based on a multiphase configuration, which is attained by combining at least two or more modules-combined multilevel power conversion apparatuses according to the present invention.

As in FIG. 16, a multiphase multilevel power conversion apparatus can be attained by combining at least two or more modules-combined multilevel power conversion apparatuses, and connecting these apparatuses in a multiphase configuration. In this case, it is possible to attain the multilevel power conversion apparatuses having a number of phases corresponding to a number of the connected modules-combined multilevel power conversion apparatuses, and to augment the manageable power in proportion to the number of phases.

The multilevel power conversion apparatus attained by combining the unit modules can be used as a power conversion apparatus for the DC/DC conversion, DC/AC conversion and AC/DC conversion.

The multilevel power conversion apparatuses attained by combining the unit modules are further combined and can be thereby used as power conversion apparatuses for a DC/AC/DC conversion, a DC/DC/AC conversion and an AC/DC/AC conversion.

As described above, the multilevel power conversion apparatus attained by combining the modules exhibiting the high scalability and versatility, flexibly can vary its circuit configuration based on configurations on a power source side and a load side, and can be applied broadly.

A short-circuit failure of the main circuit switch element occurs in the multilevel power conversion apparatus attained by combining the unit modules, in which case the output level count and the manageable power and current are reduced by controlling ON all of the main circuit switch elements of the unit modules containing the failure element; and, however, a power converter can be operated in emergency.

A certain module falls into a failure when configuring the multilevel power conversion apparatus by combining the unit modules, in which case it may be sufficient that only the failure module is replaced, and hence a cost for the failure can be minimized much further than hitherto.

The voltage applied to and the current flowing across the element differ per element depending on an operation condition and a control method in the power conversion apparatus. Consequently, non-uniformity of a temperature occurs, and it is therefore general that a life-span of each element differs. Accordingly, when the replacement is required due to deterioration with an elapse of time, the replacement with a new one can be done on a module-by-module basis without any necessity for replacing the whole at one time, thereby enabling a cost for long-term maintenance to be restrained.

The following discussion will describe a design guideline of the unit module according to the present invention. What is important to the design of the unit module is how a withstanding voltage of the unit module is designed with respect to the voltage managed by the multilevel power conversion apparatus attained by using the unit modules. Elements determined as this withstanding voltage are the main circuit switch count 2 k, a withstanding voltage $V_{rT}$ of the semiconductor power device used as the main circuit switch, and a withstanding voltage $V_{rC}$ of each capacitor to be used in the unit module. It is also required to consider how many unit modules are connected at the multi-stages or in series for use.

The design of the unit module entails selecting the elements while ensuring a margin of the withstanding voltage against the maximum voltage applied to each element in order for each main circuit switch element and each capacitor to prevent a damage to the element due to being affected by electromagnetic noises, a surge voltage and other equivalent factors.

Generally, the semiconductor power device becomes larger in ON-resistance, slower in switching and larger in loss as the element has a high withstanding voltage. The capacitor is smaller in electrostatic capacity per volume as the withstanding voltage thereof is higher. In other words, the margin of the withstanding voltage is increased, resulting in a decline of performance of the multilevel power conversion apparatus to be attained. Therefore, after attaining a safety operation, a unit module design optimal for preventing the decline of performance of the power conversion is needed.

The following discussion will describe a design guideline of the unit module in the case of attaining the multilevel power conversion apparatus of the flying capacitor type by connecting the plurality of unit modules at the multi-stages.

In the unit module, the output level count n of the multilevel power conversion apparatus of the flying capacitor type, which is attained by connecting an M-number of unit modules at the multi-stages by use of a main circuit switch element count k on the high-voltage side (the upper side in the circuit diagram) or the low-voltage side (the lower side in the circuit diagram), is given by:

[Mathematical Expression 2]

$$n = kM + 1 \quad (2)$$

A maximum voltage applied to each main circuit switch element varies depending on the main circuit switch element count k and a module connection count M within the unit module, and is given by:

[Mathematical Expression 3]

$$V_{Tmax} = E_d / kM \quad (3)$$

where $E_d$ is an input voltage of the multilevel power conversion apparatus of the flying capacitor type, which is attained by connecting the modules at the multi-stages.

On the other hand, even when connecting any number of unit modules at the multi-stages, the input voltage of the power converter is invariably applied to the capacitor closest to the input terminal. In other words, the voltage manageable by the multilevel power conversion apparatus of the flying capacitor type to be attained, corresponds to an upper limit of the withstanding voltage of the capacitor mounted in the unit module irrespective of the number of modules to be connected.

Such being the case, the design guideline is obtained by introducing withstanding voltage utilization ratios of the main circuit switch element and the capacitor for designing the unit module. A withstanding voltage utilization ratio $\lambda_T$ of the main circuit switch element, and a withstanding voltage utilization ratio of the capacitor $\lambda_C$ are defined as follows:

[Mathematical Expression 4]

$$\lambda_T = V_{Tmax} / V_{rT} \quad (4)$$

where $V_{rT}$ is the withstanding voltage of the main circuit switch element.

[Mathematical Expression 5]

$$\lambda_C = V_{Cmax} / V_{rC} \quad (5)$$

where $V_{rC}$ is the withstanding voltage of the capacitor.

Based on the mathematical expressions (1)-(4), the unit module can be designed by determining the main circuit switch element count 2 k per unit module, the withstanding voltage $V_{rT}$ of the main circuit switch element and the withstanding voltage $V_{rC}$ of the capacitor while selecting proper withstanding voltage utilization ratios from a required level count, the manageable voltage and other equivalent values of the multilevel power conversion apparatus of the flying capacitor type.

The versatility or the scalability can be adjusted by making the design taking account of the module connection count M also in order to enable the realistic withstanding voltage utilization ratio to be attained in all of assumed module connection counts by taking it into consideration that there may be varied the output level count, the manageable voltage and current and other equivalent values of the multilevel power conversion apparatus to be attained by varying the module connection count M when designing the unit module.

The multilevel power conversion circuit module to attain the safety operation and the high power conversion efficiency can be built up by designing the unit module based on the guideline described above.

The unit modules can be formed by being integrated on a printed circuit board or into a package molded of an insulator by using individual discrete elements. Ultimately, it is most desirable that the unit modules are to be formed by being integrated on one semiconductor chip of the semiconductor or an insulator substrate.

The insulator used for the package can involve employing synthetic resins, ceramics, glasses, rubbers and other equivalent materials.

The unit module is attained on one semiconductor chip, in which case the semiconductor chip has a yield that becomes worse as a size of chip area becomes larger, resulting in an increase in cost. The present invention takes a mode of separating the multiplicity of elements used for the multilevel power conversion circuit on the basis of a fixed unit and connecting the plurality of modules packaging these elements, and is thereby enabled to reduce the size of the semiconductor chip area per module. In other words, the cost per module is reduced to a great degree, and these modules are mass-produced, whereby the cost can be further reduced.

Thus, it is feasible to package the multiplicity of circuit elements while suppressing the cost problem, and hence the high-performance power conversion circuit can be attained. To be specific, as compared with the 2-level power conversion circuit based on the conventional system, the conversion efficiency can be improved by decreasing higher harmonics and the electromagnetic noises. The components instanced by a higher harmonic filter, a noise filter and a cooling device, which are attached to the power converter, can be thereby down-sized.

Example 1

Figure 17:
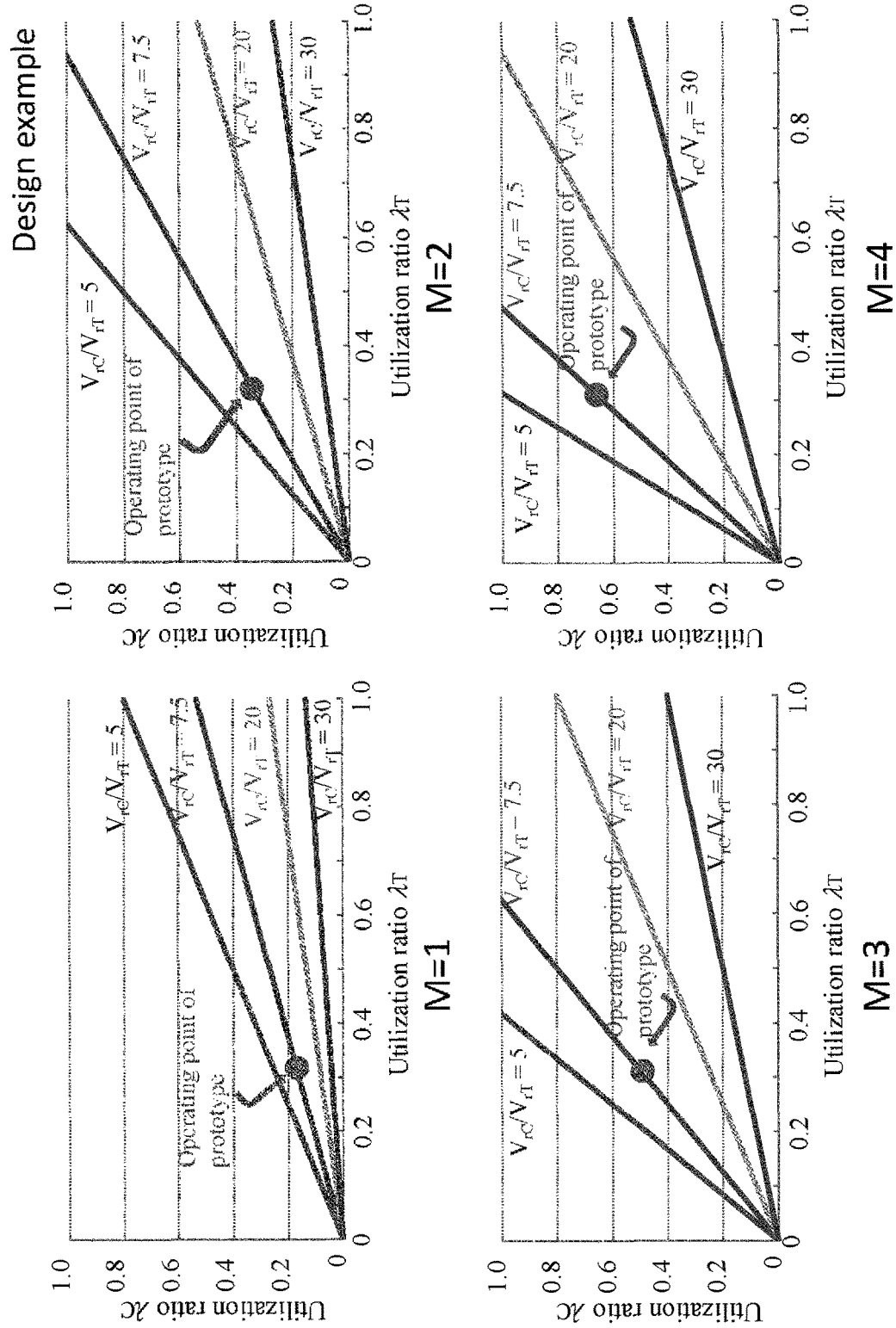
FIG. 17 is a diagram representing a relationship between withstanding voltage utilization ratios of a main circuit switch element and a capacitor with respect to a main circuit switch count and a module multi-stage connection count for designing a unit module according to the present invention.

FIG. 17 illustrates withstanding voltage utilization ratios of the main circuit switch element and the capacitor per module connection count M when k=4 based on the mathematical expressions (2)-(5). An operating point moves on a straight line by varying an input voltage. Based on this movement of the operating point, the main circuit switch element count 2 k per unit module, the module connection count M, the withstanding voltage $V_{rT}$ of the main circuit switch element and the withstanding voltage $V_{rC}$ of the capacitor can be determined while selecting the proper withstanding voltage utilization ratios from a required level count, the manageable voltage and other equivalent values of the multilevel power conversion circuit to be attained.

Figure 18:
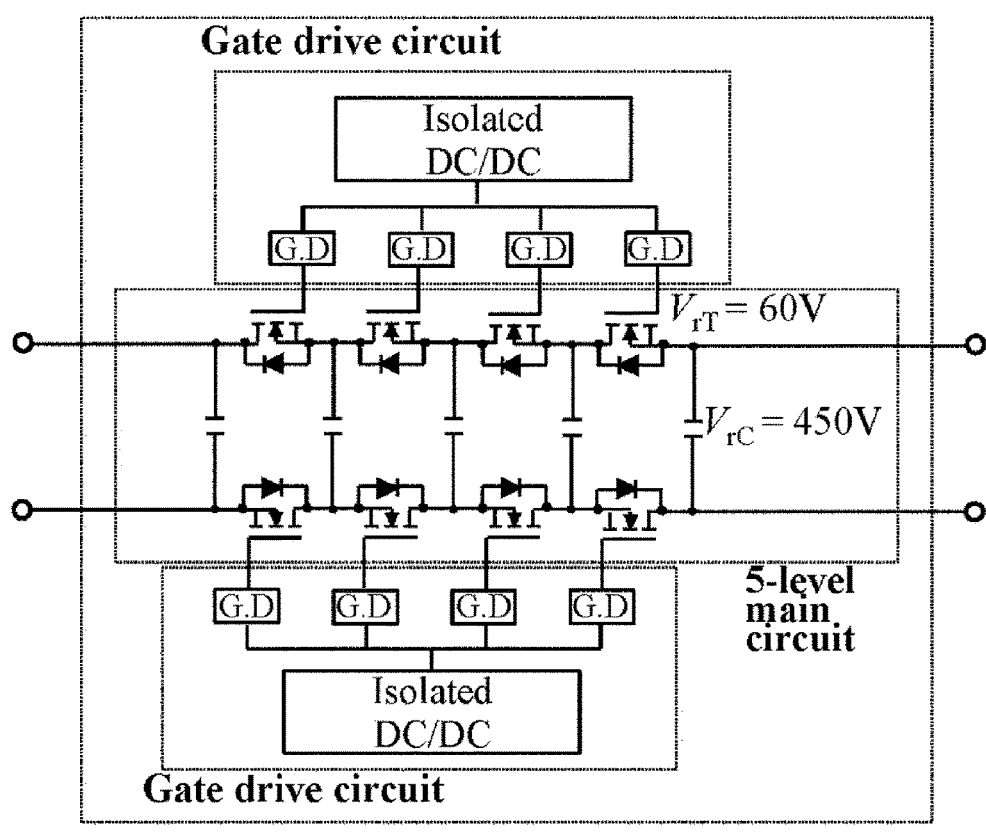
FIG. 18 is a diagram of a circuit configuration of the unit module manufactured as the 5-level multilevel power conversion apparatus of the flying capacitor type, which is configured to include eight main circuit switch elements and five capacitors, in Example of the present invention.

The present experimental manufacture aims at designing and manufacturing, as a prototype, an inverter (DC/AC converter) having a maximum input of DC voltage "300V", and the unit module is designed as below. At first, the circuit configuration is a configuration of adding the capacitors to the output terminals with the main circuit switch element count k being "4" (k=4), i.e., a flying capacitor type multi-level power conversion circuit, e.g., a 5-level power conversion circuit in FIG. 18, is configured by including eight main circuit switch elements and five capacitors. The multilevel power conversion circuit is to be used, in which the required level count is set to "5" through "17", and the module connection count M is set to about "1" through "4". Under this condition, a withstanding voltage utilization ratio $\lambda_T$ of the main circuit switch element is determined equal to or smaller than 40%, and a withstanding voltage utilization ratio $\lambda_C$ of the capacitor is determined equal to or smaller than 75% on the basis of FIG. 17, in which the main circuit switch element and the capacitor are selected from Si-MOSFETs and capacitors that are available on the market; the withstanding voltage $V_{rT}$ of the main circuit switch element is set to 60V ($V_{rT}$=60V); and the withstanding voltage $V_{rC}$ of the capacitor is set to 450V ($V_{rC}$=450V). In this design, the module connection count M is set to "4", and the input voltage is set to "300V", in which case the actual withstanding voltage utilization ratio $V_T$ of the main circuit switch element was 31.3%; and the actual withstanding voltage utilization ratio $\lambda_C$ of the capacitor was 66.7%. The operating points when M=1 to 4 are indicated by black points illustrated in FIG. 17.

Figure 19:
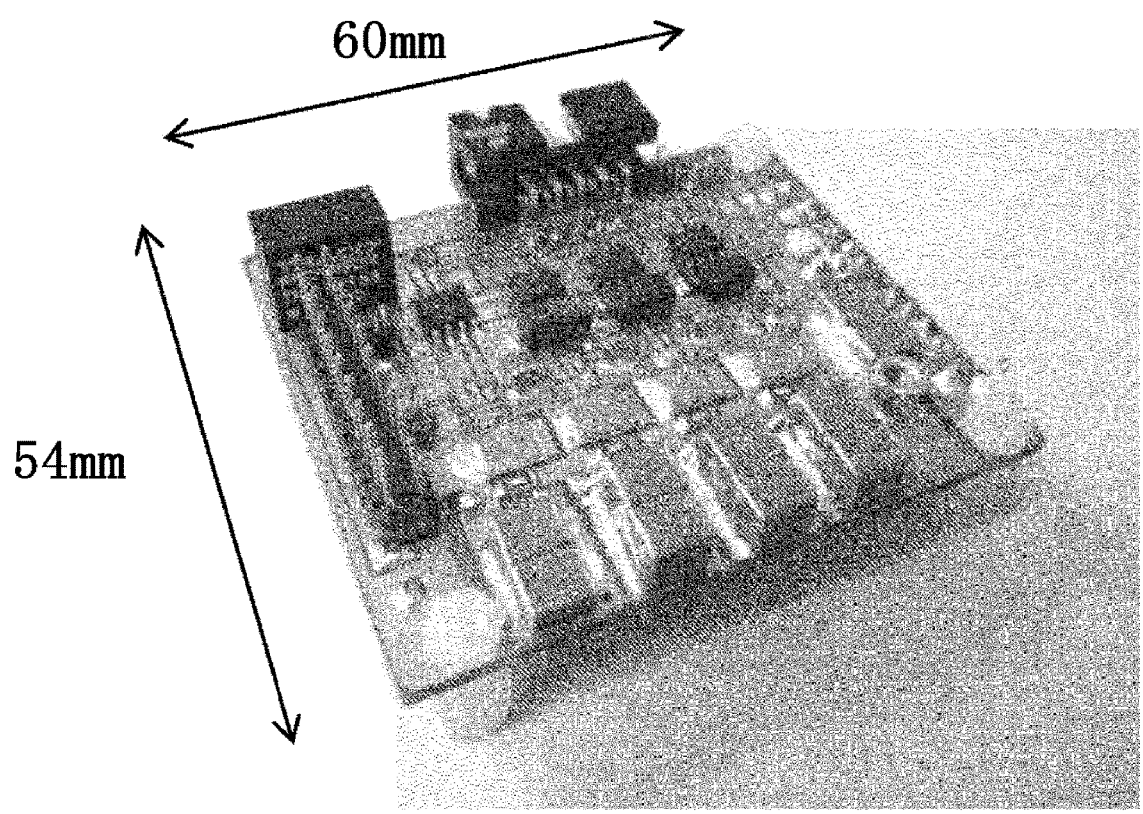
FIG. 19 depicts an external appearance of the unit module manufactured as a prototype in Example of the present invention.

FIG. 19 illustrates the unit module being actually manufactured as the prototype. All of the elements are packaged on a double-sided board. The unit module is equipped with gate drive circuits for driving the respective MOSFETs and connectors for establishing connections with other modules in addition to the elements functioning as the power conversion circuit on front and back surfaces thereof.

Each gate drive circuit is equipped with the signal insulation based on a level shift circuit having a built-in gate driver IC and the power source insulation based on a bootstrap circuit, and enables a switching operation of the MOSFET without depending on the module connection method.

Figure 20:
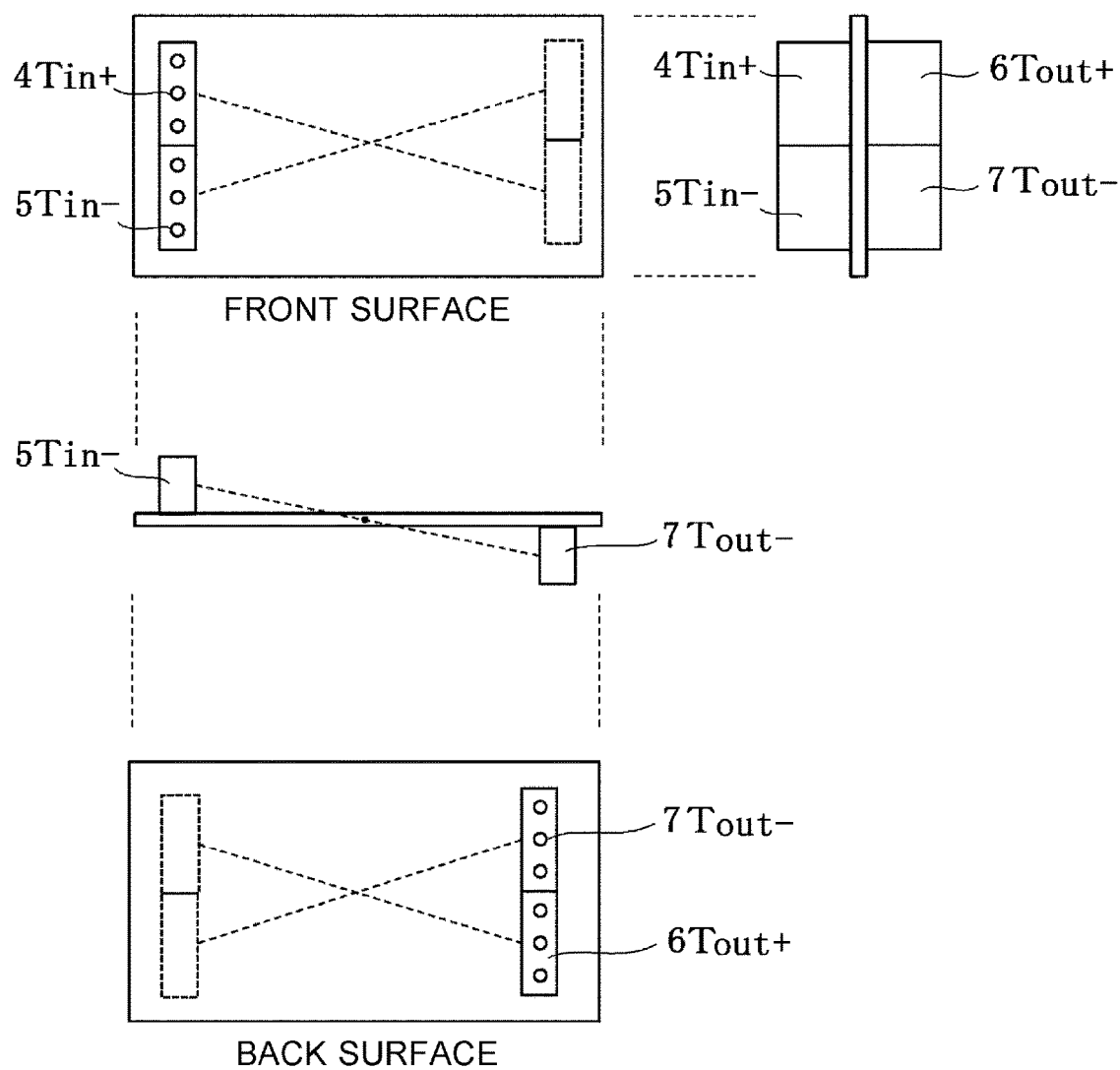
FIG. 20 illustrates an arrangement of connectors equipped in the prototype unit modules in Example of stacking the modules alternately in a perpendicular direction according to the present invention.

The connectors are, as in FIG. 20, packaged in plane symmetry on the front and back surfaces and in point symmetry on the front surface or the back surface. To be specific, the front surface is packaged with two terminals of the capacitor at both ends, and the back surface is packaged with two terminals, i.e., the low-voltage terminal of the main circuit switch element on the high side and the high-voltage terminal of the main circuit switch element on the low side. With this packaging, the modules are stacked alternately in a perpendicular direction, thereby enabling the multistage connections to be attained as indicated in a rightward lower portion of FIG. 33 and attaining a downsized multilevel power conversion circuit of the flying capacitor type.

Figure 21:
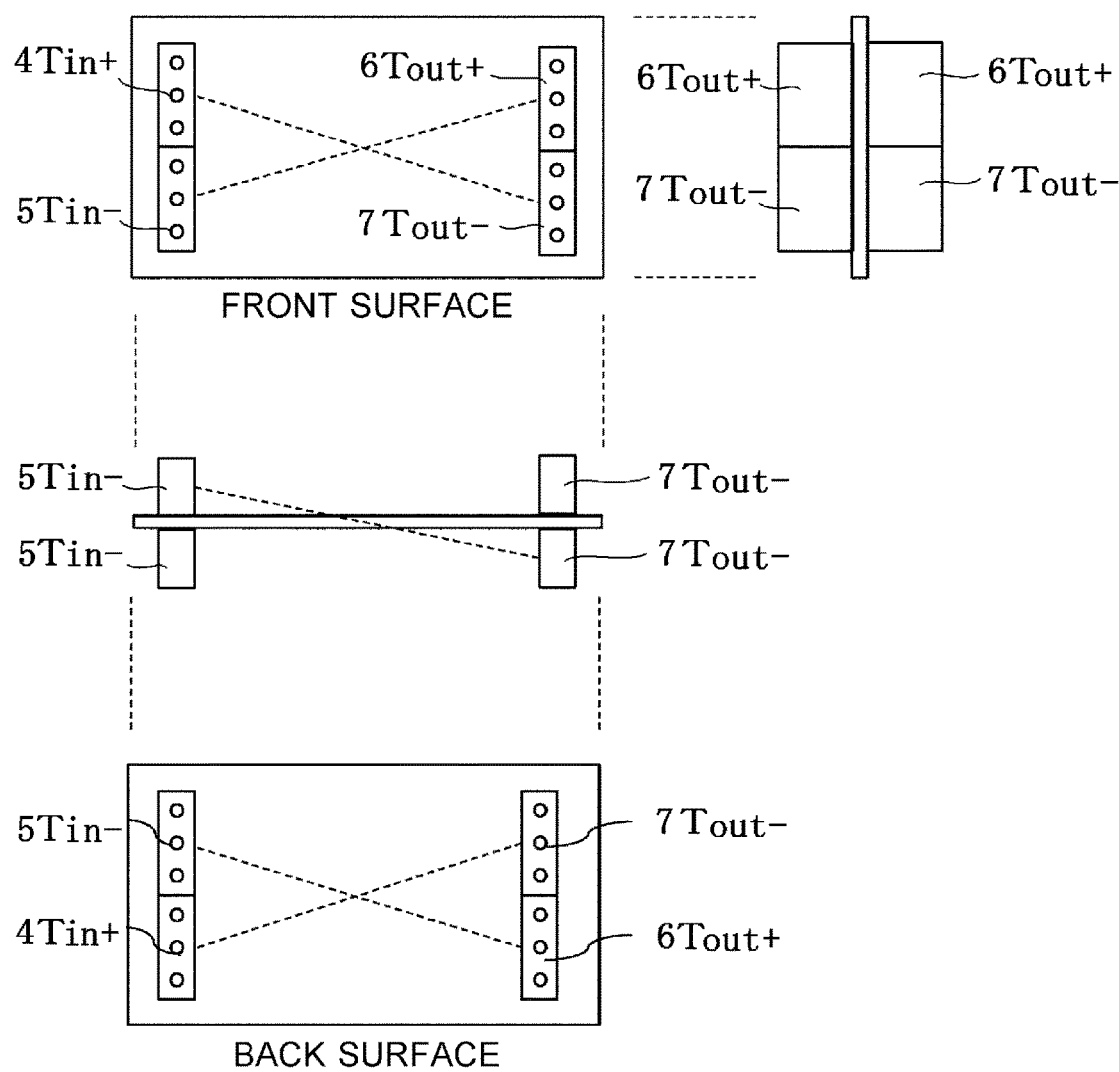
FIG. 21 illustrates a modified example of the arrangement of the connectors equipped in the unit modules in Example of stacking the modules with the same directivity according to the present invention.

In FIG. 21, each of the front and back surfaces of each module is equipped with the two terminals of the capacitor at both ends, and the two terminals, i.e., the low-voltage terminal of the main circuit switch element on the high side and the high-voltage terminal of the main circuit switch element on the low side. With this equipment, the modules are stacked alternately in the perpendicular direction, and one terminals of both of the terminals on the front and back surfaces are made non-conductive, whereby the multistage connections as indicated in the rightward lower portion of FIG. 33 are arranged to attain parallel connections as indicated in a rightward lower portion of FIG. 5 by stacking the modules in the same direction.

In the present invention, a wiring distance between the modules result in becoming longer in terms of a structure than wiring within the module. In the power conversion circuit, the long wiring causes the electromagnetic noises, and hence, though the connection method between the modules is highly important, the packaging method of stacking the modules alternately in the perpendicular direction provides a structure important for shortening the wiring distance between the modules.

Figure 22:
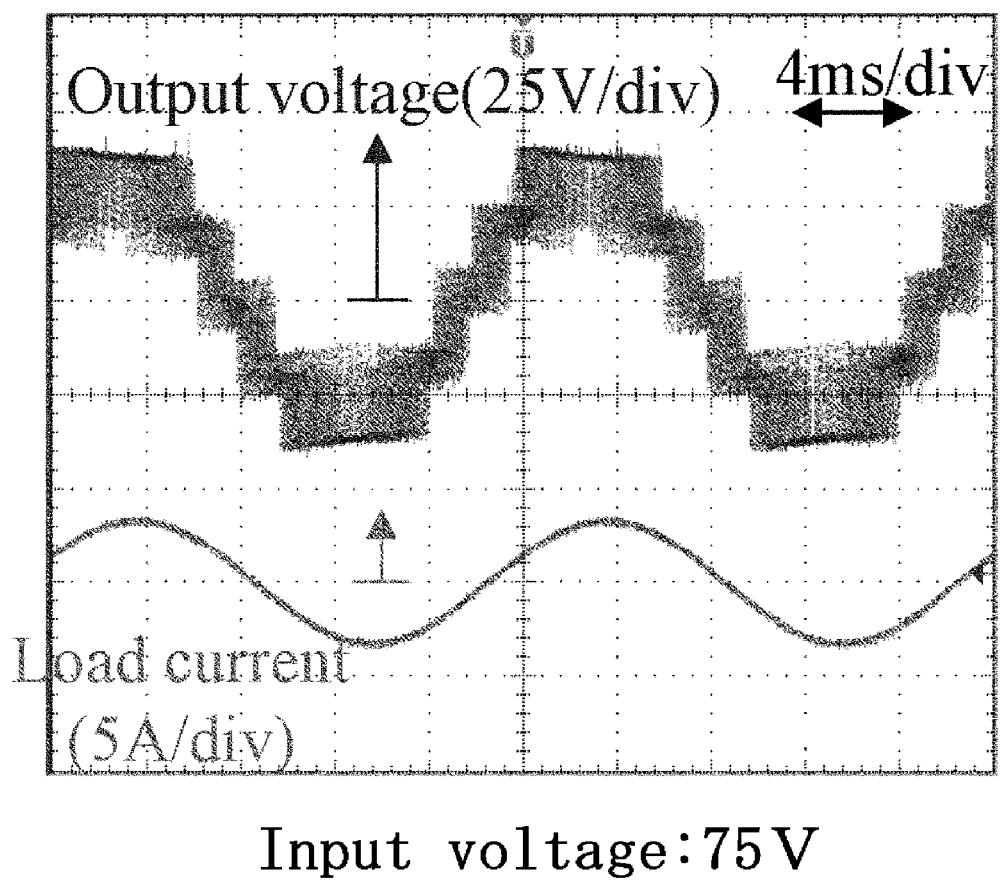
FIG. 22 depicts an experimental waveform of the prototype unit module in Example of the present invention.

FIG. 22 depicts an experimental waveform obtained from the prototype unit module described above, in which a 5-level voltage waveform was acquired normally at an input voltage of 75V.

Figure 23:
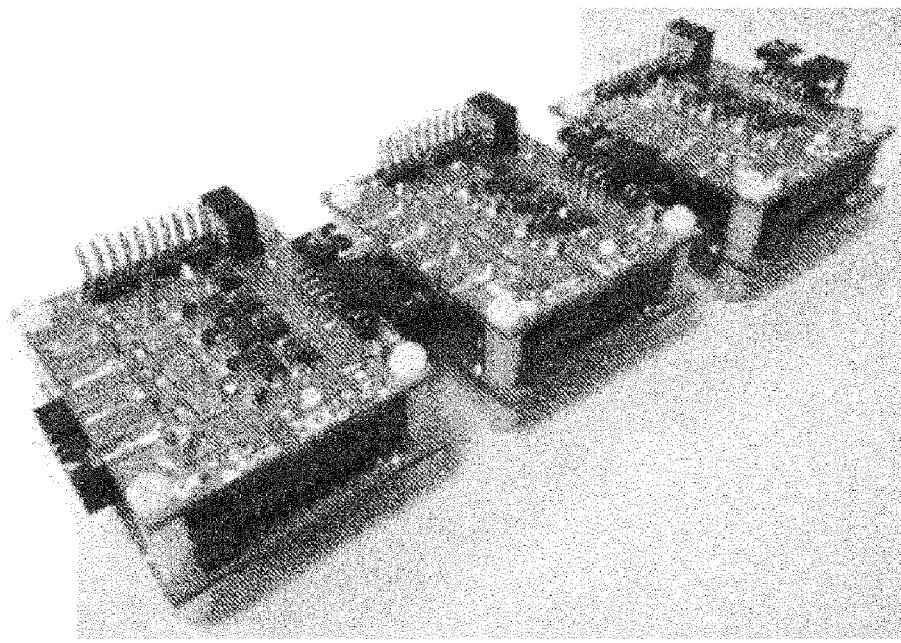
FIG. 23 depicts an external appearance of a 3-phase/9-level multilevel power conversion apparatus of the flying capacitor type, which is configured to include the six modules, in Example of the present invention.
Figure 23:
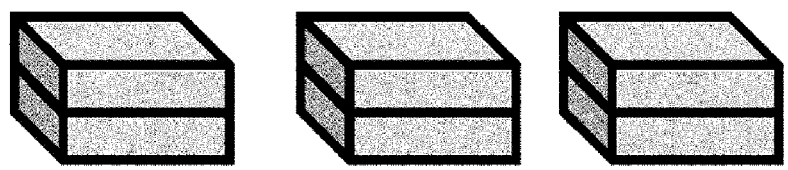
Figure 24:
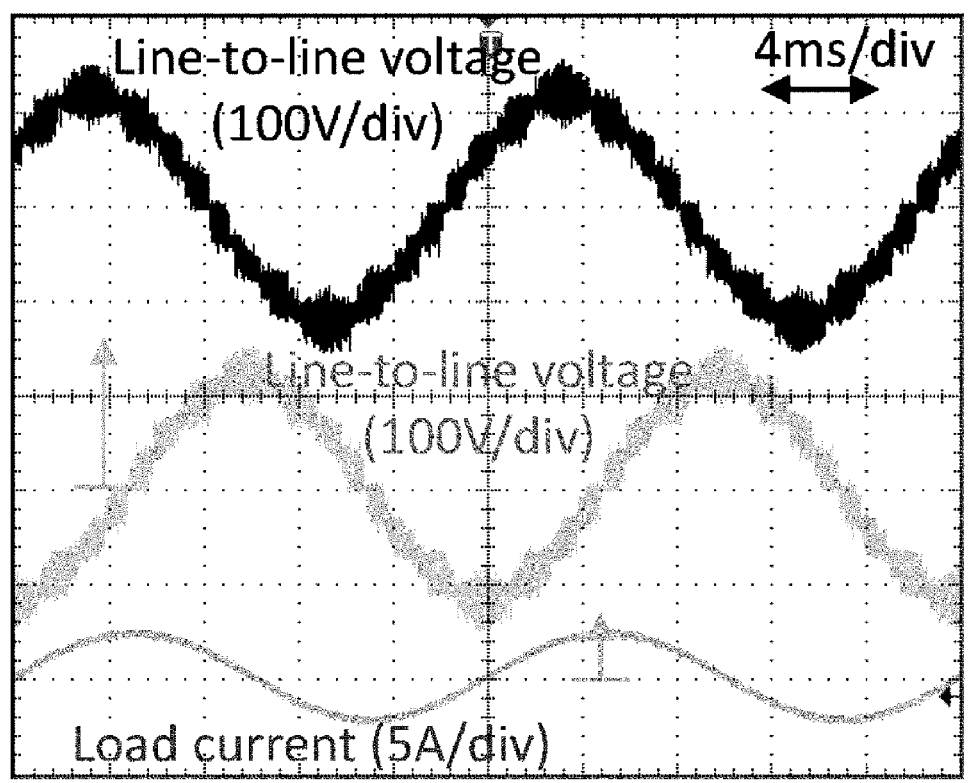
FIG. 24 depicts an experimental waveform of the 3-phase/9-level multilevel power conversion apparatus of the flying capacitor type, which is configured to include six modules, in Example of the present invention.

FIG. 23 illustrates a 3-phase/9-level multilevel power conversion apparatus of the flying capacitor type, which is configured of totally six modules by stacking two prototype unit modules per phase and preparing the six modules for three phases. FIG. 24 depicts the obtained experimental waveform, and it was confirmed that the operation was performed normally at the input voltage of 150V.

Figure 25:
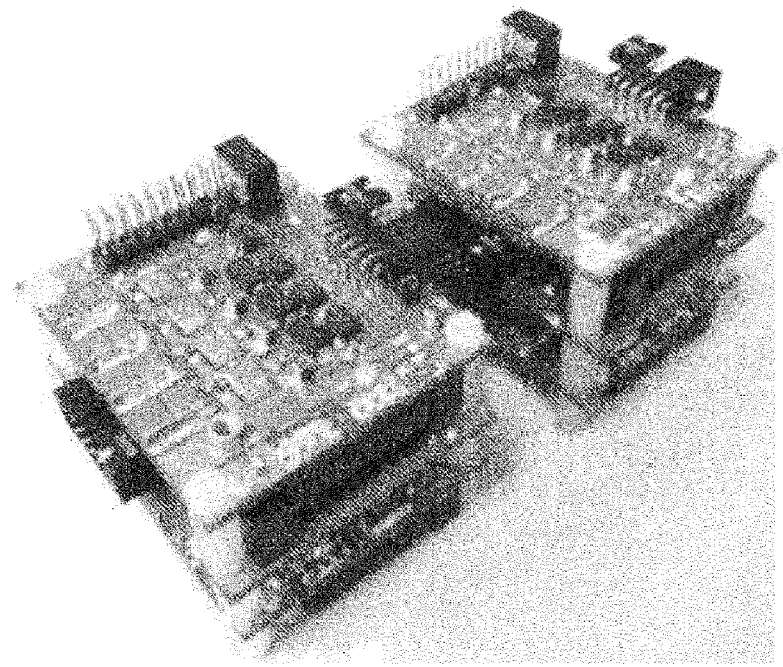
FIG. 25 depicts an external appearance of a single-phase/full bridge/13-level multilevel power conversion apparatus of the flying capacitor type, which is configured to include the six modules, in Example of the present invention.
Figure 25:
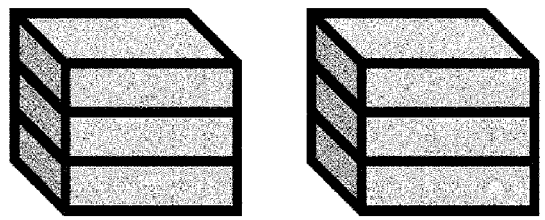
Figure 26:
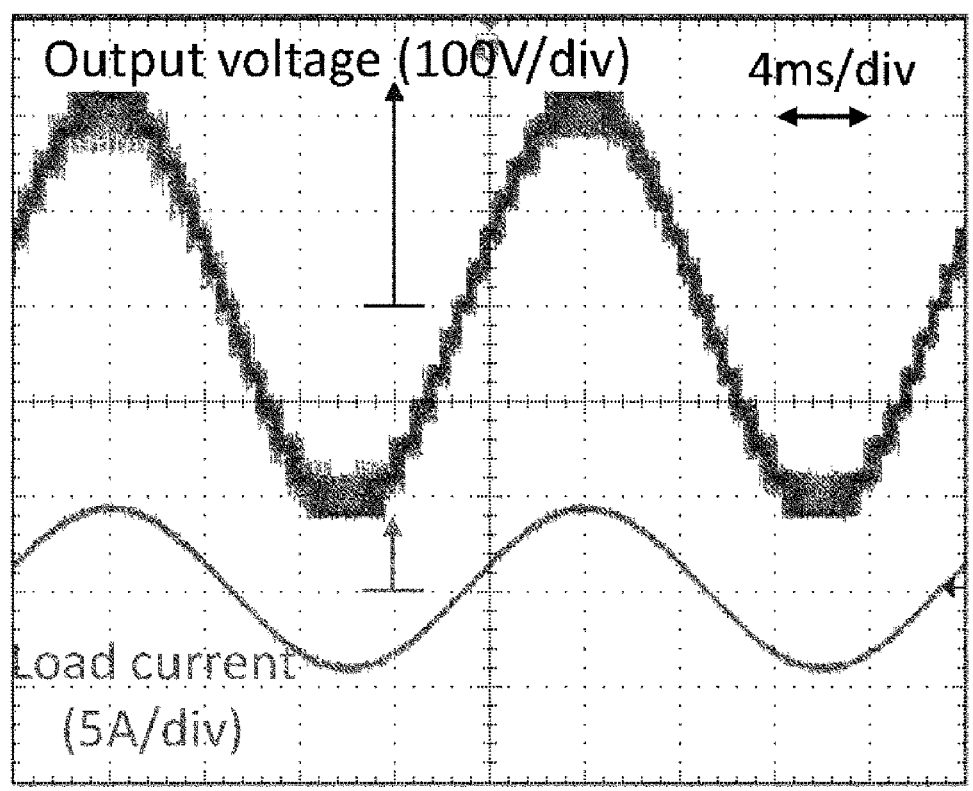
FIG. 26 depicts an experimental waveform of the single-phase/full bridge/13-level multilevel power conversion apparatus of the flying capacitor type, which is configured to include the six modules, in Example of the present invention.

FIG. 25 illustrates a single-phase/13-level multilevel power conversion apparatus of the flying capacitor type, which is configured of totally six modules by stacking three modules per phase and preparing two sets of 3-stacked modules. FIG. 26 depicts the obtained experimental waveform, and it was confirmed that the operation was performed normally at the input voltage of 225V that is 1.5-fold as large as the voltage of the 9-level power conversion circuit.

Figure 27:
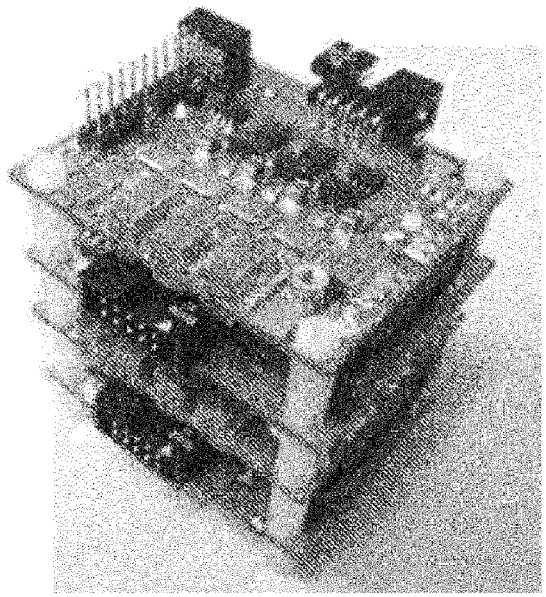
FIG. 27 depicts an external appearance of a single-phase/half bridge/17-level multilevel power conversion apparatus of the flying capacitor type, which is configured to include the four modules, in Example of the present invention.
Figure 27:
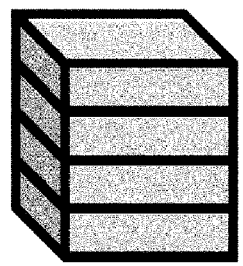
Figure 28:
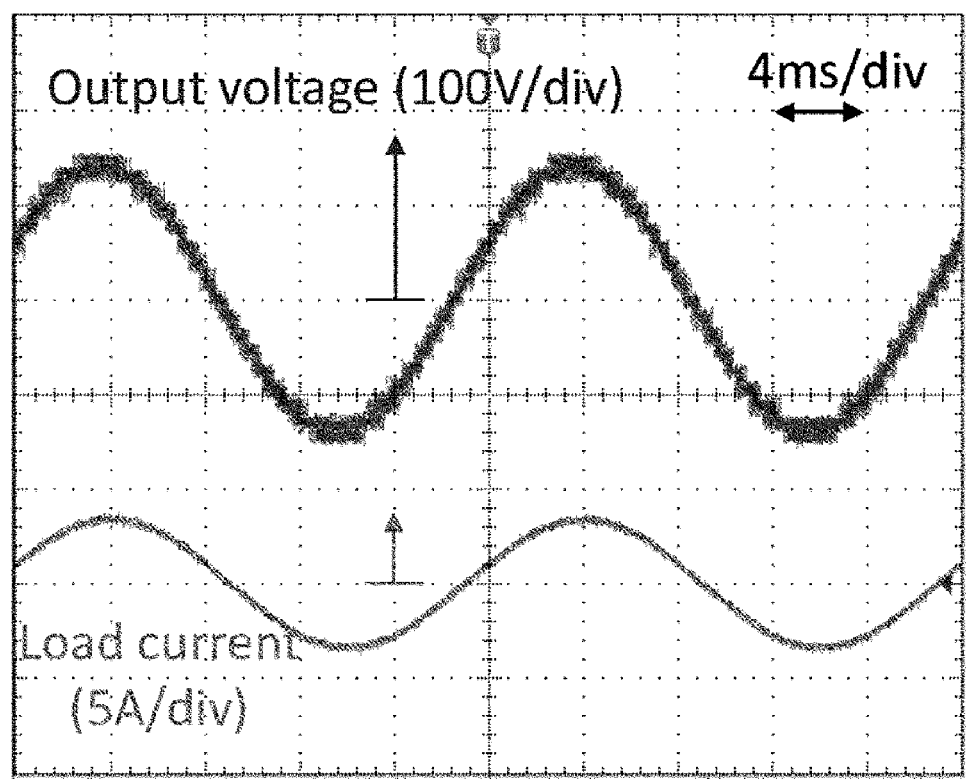
FIG. 28 depicts an experimental waveform of the single-phase/half bridge/17-level multilevel power conversion apparatus of the flying capacitor type, which is configured to include the four modules, in Example of the present invention.

FIG. 27 illustrates a single-phase/half-bridge/17-level multilevel power conversion apparatus of the flying capacitor type, which is configured of totally four modules by stacking four modules per phase. FIG. 28 depicts the obtained experimental waveform, and it was confirmed that the operation was performed normally at the input voltage of 300V that is twice as large as the voltage of the 9-level power conversion circuit.

It is understood from FIGS. 19-28 that the stage count (level count) of the output voltage of the modules-combined multilevel power conversion circuit becomes larger as a stack count of the modules is set larger, and the waveform approximates a sine wave alternating current. In other words, it is said that as the stack count of the modules increases, the output harmonics and the electromagnetic noises of the power converter can be reduced, and the power conversion performance is improved.

As described above, the present experimental manufacture attained the three multilevel power conversion apparatuses of the flying capacitor type, which have the level counts of "9" through "17", the voltages of "60V" through "300V" and the circuit configurations of the 3-phase, the single-phase full bridge and the single-phase half bridge, by combining the six unit modules on a plural basis and varying the connection method thereof.

Figure 29:
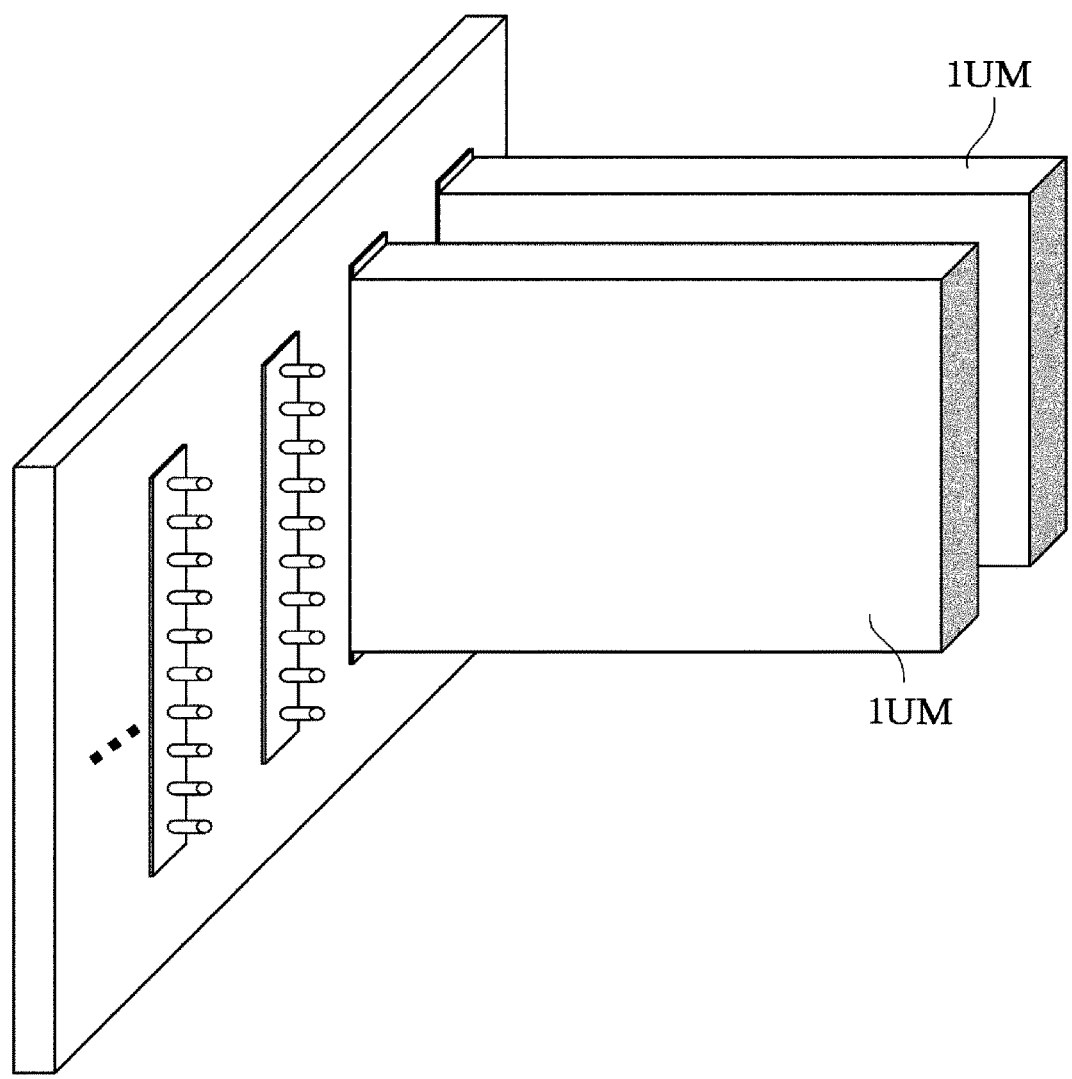
FIG. 29 illustrates the multilevel power conversion apparatus configured by connecting the plurality of unit modules to a module connection device equipped with connectors for connecting the plurality of modules and wiring between the connectors according to the present invention.

Example 1 has described the direct connection method of stacking the modules each other, and the versatility can be, however, further enhanced by establishing the connection via another device between the modules. FIG. 29 illustrates the multilevel power conversion apparatus configured by connecting the plurality of modules to a module connection device equipped with connectors for connecting the plurality of modules and the wiring between these connectors, each module being equipped with the two terminals of the capacitor on both ends and the two terminals, i.e., the low-voltage terminal of the main circuit switch element on the high side and the high-voltage terminal of the main circuit switch element on the low side. The versatility can be further improved by equipping a mechanism for arbitrarily changing the wiring between the connectors through a switch.

INDUSTRIAL APPLICABILITY

The present invention can be applied to a power supply unit for a motor drive apparatus, a photovoltaic power generation system and a wind power generation system, a power supply unit instanced by an uninterruptible power supply (UPS) unit, and a power supply unit for electronic equipment.

In the multilevel power conversion apparatus configured by the present module units, the rating is defined by combining the variety of connections of the module units, and it is therefore feasible to provide the method being superior in terms of the scalability/flexibility and being simple/elaborate in terms of the variety of power conversions. Further, the rating can be defined dynamically on site, and hence, there can be the flexibility to emergencies instanced by earthquake disasters on condition that a large quantity of module units corresponding to the rating in a required range are to be prepared.

REFERENCE TO SIGNS LIST

1 UM: unit module
2 PCC: main circuit of unit module
3 GDC: gate drive circuit of unit module
4 $T_{in+}$: high-voltage terminal of capacitor of unit module
5 $T_{in-}$: low-voltage terminal of capacitor of unit module
6 $T_{out+}$: low-voltage terminal of main circuit switch element on high side of unit module
7 $T_{out-}$: high-voltage terminal of main circuit switch element on low side of unit module
8 Shn: main circuit switch element on high side of unit module
9 Sln: main circuit switch element on low side of unit module
10 C: capacitor
11 $E_d$: input DC power source
12 LD: load
13 R: resistance

What is claimed is:

1. A unit power conversion circuit comprising:
a main circuit configured to include one or more capacitors and two or more main circuit switch elements; and
gate drive circuits driving the two or more main circuit switch elements,
the unit power conversion circuit being configured as a minimum circuit wherein: the main circuit includes (i) a high-sided main circuit switch element with a high-voltage terminal being connected to one terminal of one of the one or more capacitors and (ii) a low-sided main circuit switch element with a low-voltage terminal being connected to the other terminal of the one of the one or more capacitors; a low-voltage terminal of the high-sided main circuit switch element and a high-voltage terminal of the low-sided main circuit switch element are respectively opened; and the gate drive circuits are insulated from the main circuit in signal and insulated from the main circuit in power source, alternatively,
the unit power conversion circuit being configured as a circuit containing a plurality of minimum circuits, including a first minimum circuit and a next minimum circuit, wherein: (i) the plurality of minimum circuits are connected at two or more multi-stages by connections between terminals of the plurality of minimum circuits, including: high-voltage terminals of high-sided main circuit switch elements that are connected to first sides of the one or more capacitors, low-voltage terminals of high-sided main circuit switch elements, low-voltage terminals of low-sided main circuit switch elements that are connected to second sides of the one or more capacitors, and high-voltage terminals of low-sided main circuit switch elements; (ii) a low-voltage terminal of a high-sided main circuit switch element of the first minimum circuit is connected to a high-voltage terminal of a next high-sided main circuit switch element of the next minimum circuit; (iii) a high-voltage terminal of a low-sided main circuit switch element of the first minimum circuit is connected to a low-voltage terminal of a next low-sided main circuit switch element of the next minimum circuit; (iv) a lowest-voltage terminal of a high-sided main circuit switch element of a final multi-stage of the two or more multi-stages and a highest-voltage terminal of a low-sided main circuit switch element of the final multi-stage are respectively opened; and (v) the gate drive circuits are insulated from the main circuit in signal and insulated from the main circuit in power source.

2. A module for a power conversion apparatus, comprising:
the unit power conversion circuit according to claim 1, the circuit including at least four terminals, including: (i) a highest-voltage terminal of the main circuit switch element on a high side of the module, being the high-voltage terminal of the high-sided main circuit switch element of the minimum circuit or the high-voltage terminal of the high-sided main switch circuit of the first minimum circuit, (ii) a lowest-voltage terminal of the main circuit switch element on the high side of the module, being the low-voltage terminal of the high-sided main circuit switch element of the minimum circuit or the lowest-voltage terminal of the high-sided main switch circuit of the final multi-stage of the plurality of minimum circuits, (iii) a lowest-voltage terminal of the main circuit switch element on a low side of the module, being the low-voltage terminal of the low-sided main circuit switch element of the minimum circuit or the low-voltage terminal of the low-sided main switch circuit of the first minimum circuit, and (iv) a highest-voltage terminal of the main circuit switch element on the low side of the module, being the high-voltage terminal of the low-sided main circuit switch element of the minimum circuit or the highest-voltage terminal of the low-sided main switch circuit of the final multi-stage of the plurality of minimum circuits,
all of the at least four terminals and the unit power conversion circuit being packaged as the module by being packaged on one board, or packaged as a package covered with one insulator, or packaged as a package covered with one insulator and a metal, or packaged batchwise into one semiconductor.

3. The module for the power conversion apparatus according to claim 2, wherein each of the at least four terminals of the module has a connection mechanism enabling said each of the at least four terminals to connect with any of at least four terminals of another module configured identically to the module.

4. A multilevel power conversion apparatus comprising:
two or more modules for the power conversion apparatus according to claim 2, the two or more modules being combined to configure a multilevel power conversion apparatus of a flying capacitor type.

5. The multilevel power conversion apparatus according to claim 4, wherein the multilevel power conversion apparatus of the flying capacitor type according to claim 4 is configured by: (i) connecting a lowest-voltage terminal of the main circuit switch element on the high side of a first module of the two or more modules to a highest-voltage terminal of the main circuit switch element on the high side of a second module of the two or more modules; (ii) connecting a highest-voltage terminal of the main circuit switch element on the low side of the first module to a lowest-voltage terminal of the main circuit switch element on the low side of the second module; (iii) connecting terminals of one or more additional modules of the two or more modules to the multilevel power conversion apparatus by connecting terminals of the additional module to further terminals of the four or more terminals of the next module and (iv) configuring an output terminal by connecting a lowest-voltage terminal of the main circuit switch element on the high side of an extremity module of the two or more modules to a highest-voltage terminal of the main circuit switch element on the low side of the extremity module.

6. A multilevel power conversion apparatus comprising: three or more modules for the power conversion apparatus according to claim 2, the three or more modules being combined to configure a multilevel power conversion apparatus of an active neutral clamp type.

7. The multilevel power conversion apparatus according to claim 6, wherein the multilevel power conversion apparatus of the active neutral clamp type is configured by: (i) connecting a lowest-voltage terminal of the main circuit switch element on the low side of a first module of the three or more modules to a highest-voltage terminal of the main circuit switch element on the high side of a second module of the three or more modules; (ii) connecting together a lowest-voltage terminal of the main circuit switch element on the high side of the first module, a highest-voltage terminal of the main circuit switch element on the low side of the first module and a highest-voltage terminal of the main circuit switch element on the low side of a third module of the three or more modules; (iii) connecting together a lowest-voltage terminal of the main circuit switch element on the high side of the second module, a highest-voltage terminal of the main circuit switch element on the low side of the second module and a lowest-voltage terminal of the main circuit switch element on the high side of the third module; and (iv) configuring an output terminal by connecting a highest-voltage terminal of the main circuit switch element on the high side of the third module to a lowest-voltage terminal of the main circuit switch element on the low side of the third module.

8. A multilevel power conversion apparatus comprising: four or more modules for the power conversion apparatus according to claim 2, the four or more modules being combined to configure a multilevel power conversion apparatus of a hybrid active neutral clamp type.

9. The multilevel power conversion apparatus according to claim 8, wherein the multilevel power conversion apparatus of the hybrid active neutral clamp type is configured by: (i) connecting a lowest-voltage terminal of the main circuit switch element on the low side of a first module of the four or more modules to a highest-voltage terminal of the main circuit switch element on the high side of a second module of the four or more modules; (ii) connecting together a lowest-voltage terminal of the main circuit switch element on the high side of the first module, a highest-voltage terminal of the main circuit switch element on the low side of the first module and a highest-voltage terminal of the main circuit switch element on the low side of a third module of the four or more modules; (iii) connecting together a lowest-voltage terminal of the main circuit switch element on the high side of the second module, a highest-voltage terminal of the main circuit switch element on the low side of the second module and a lowest-voltage terminal of the main circuit switch element on the high side of the third module; (iv) connecting a highest-voltage terminal of the main circuit switch element on the high side of the third module to a lowest-voltage terminal of the main circuit switch element on the low side of a fourth module of the four or more modules; (v) connecting a lowest-voltage terminal of the main circuit switch element on the low side of the third module to a highest-voltage terminal of the main circuit switch element on the high side of the fourth module; and (vi) configuring an output terminal by connecting a lowest-voltage terminal of the main circuit switch element on the high side of the fourth module to the highest-voltage terminal of the main circuit switch element on the low side of the fourth module.

10. A multilevel power conversion apparatus comprising: four or more modules for the power conversion apparatus according to claim 2, the four or more modules being combined to configure a multilevel power conversion apparatus of a stacked multicell type.

11. The multilevel power conversion apparatus according to claim 10, wherein the multilevel power conversion apparatus of the stacked multicell type is configured by: (i) connecting a lowest-voltage terminal of the main circuit switch element on the high side of the first module of the four or more modules to a highest-voltage terminal of the main circuit switch element on the high side of the third module of the four or more modules; (ii) connecting a highest-voltage terminal of the main circuit switch element on the low side of the first module to a highest-voltage terminal of the main circuit switch element on the low side of the second module of the four or more modules; (iii) connecting a lowest-voltage terminal of the main circuit switch element on the low side of the second module to the a lowest-voltage terminal of the main circuit switch element on the low side of the third module; (iv) connecting a highest-voltage terminal of the main circuit switch element on the high side of the second module to a lowest-voltage terminal of the main circuit switch element on the low side of the fourth module of the four or more modules; (v) connecting a highest-voltage terminal of the main circuit switch element on the low side of the third module to a highest-voltage terminal of the main circuit switch element on the high side of the fourth module; (vi) connecting a capacitor of the one or more capacitors between a lowest-voltage terminal of the main circuit switch element on a low side of the first module and the lowest-voltage terminal of the main circuit switch element on the high side of the second module; (vii) setting, as input terminals, a highest-voltage terminal of the main circuit switch element on the high side of the first module and the lowest-voltage terminal of the main circuit switch element on the high side of the second module; (viii) and setting, as output terminals, a lowest-voltage terminal of the main circuit switch element on the high side of the third module, a lowest-voltage terminal of the main circuit switch element on the high side of the module the fourth module and a highest-voltage terminal of the main circuit switch element on the low side of the fourth module.

12. The multilevel power conversion apparatus according to claim 4, wherein each of the two or more modules is equipped with a structure capable of attaining multi-stage connections and parallel connections by stacking the two or more modules in a perpendicular direction, an arrangement being wherein (i) the highest-voltage terminal of the main circuit switch element on the high side of the module and the lowest-voltage terminal of the main circuit switch element on the low side of the module and (ii) the lowest-voltage terminal of the main circuit switch element on the high side of the module and the highest-voltage terminal of the main circuit switch element on the low side of the module are disposed in plane symmetry on respective front and back surfaces with respect to each surface and in point symmetry on the front or back surface with respect to each other in each module of the two or more modules, or alternatively (i) the highest-voltage terminal of the main circuit switch element on the high side of the module and the lowest-voltage terminal of the main circuit switch element on the low side of the module and (ii) the lowest-voltage terminal of the main circuit switch element on the high side of the module and the highest-voltage terminal of the main circuit switch element on the low side of the module are disposed in point symmetry on each of the front and back surfaces with respect to each other.

13. The multilevel power conversion apparatus according to claim 4, wherein each of the two or more modules includes a mechanism capable of connecting with a device for connecting the two or more modules.

14. The multilevel power conversion apparatus according to claim 4, wherein a resistance is connected between the high-voltage terminal and the low-voltage terminal of each main circuit switch element of the two or more main circuit switch elements.

15. The multilevel power conversion apparatus according to claim 4, wherein each of the two or more modules includes an additional capacitor is connected between the low-voltage terminal of the main circuit switch element on the high side and the high-voltage terminal of the main circuit switch element on the low side.

* * * * *